(12) United States Patent
Roberson et al.

(10) Patent No.: US 12,039,219 B2
(45) Date of Patent: Jul. 16, 2024

(54) SYSTEMS FOR PROVIDING ACCESS TO PERSONALIZED USER ENVIRONMENTS

(71) Applicant: BANK OF AMERICA CORPORATION, Charlotte, NC (US)

(72) Inventors: Daniel Thomas Roberson, Davidson, NC (US); Guarav Ramesh Khanna, Marietta, GA (US); Trevor Aitchison Runberg, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/725,952

(22) Filed: Apr. 21, 2022

(65) Prior Publication Data
US 2023/0051570 A1 Feb. 16, 2023

Related U.S. Application Data

(60) Provisional application No. 63/233,541, filed on Aug. 16, 2021.

(51) Int. Cl.
| | | |
|---|---|---|
| *G06F 3/0482* | (2013.01) | |
| *G06F 3/0484* | (2022.01) | |
| *G06F 3/14* | (2006.01) | |
| G06F 3/147 | (2006.01) | |
| G06F 9/445 | (2018.01) | |

(52) U.S. Cl.
CPC ............ *G06F 3/1454* (2013.01); *G06F 3/147* (2013.01); *G06F 9/4451* (2013.01)

(58) Field of Classification Search
CPC ..... G06F 3/1454; G06F 3/0482; G06F 3/0481
See application file for complete search history.

(56) References Cited

U.S. PATENT DOCUMENTS

| | | | |
|---|---|---|---|
| 6,047,067 A | 4/2000 | Rosen | |
| 7,004,382 B2 | 2/2006 | Sandru | |
| 7,494,052 B1 | 2/2009 | Carpenter et al. | |
| 7,641,113 B1 | 1/2010 | Alvarez et al. | |
| 7,819,308 B2 | 10/2010 | Osterberg et al. | |
| 8,301,565 B2 | 10/2012 | Cantley et al. | |
| 8,570,281 B2 * | 10/2013 | Black ................. | G06Q 10/10 713/168 |
| 8,630,950 B2 | 1/2014 | Saegert et al. | |

(Continued)

OTHER PUBLICATIONS

Malik, Hafiz, et al., "Remote Check Truncaton Systems: Vulnerability Analysis and Countermeasures", IEEE Access, vol. 8, 2020, dated Apr. 7, 2020, 26 pages.

*Primary Examiner* — Jordany Nunez
(74) *Attorney, Agent, or Firm* — Moore & Van Allen PLLC; Nicholas C. Russell

(57) ABSTRACT

Various systems, methods, and computer program products are provided for providing access to personalized user environments. A system provided allows a user of a first party (e.g., a bank employee) to toggle between a first party user environment and a second party user environment, the first party user environment being an environment only viewable by a user of the first party and the second party user environment rendered to user of the first party as viewable by a user of a second party (e.g., a client). The first party user environment can also receive data relating to activity of the second party user environment in order to take actions (e.g., provide recommendations) in response to said activity.

20 Claims, 19 Drawing Sheets

(56) References Cited

U.S. PATENT DOCUMENTS

| | | | |
|---|---|---|---|
| 9,384,393 B2 | 7/2016 | Smith et al. | |
| 9,462,226 B1* | 10/2016 | Mizuhara | A61B 5/00 |
| 9,699,406 B1* | 7/2017 | Pranger | H04N 7/08 |
| 10,511,805 B2* | 12/2019 | Taylor | H04L 65/1069 |
| 10,656,898 B1* | 5/2020 | Mossoba | G06F 3/1454 |
| 10,827,149 B2* | 11/2020 | Pranger | H04L 65/4025 |
| 10,846,667 B1 | 11/2020 | Hecht | |
| 10,929,842 B1 | 2/2021 | Arvanaghi et al. | |
| 11,049,042 B2* | 6/2021 | Neelamana | G06N 20/00 |
| 11,218,665 B2* | 1/2022 | Pranger | G06Q 20/3223 |
| 11,270,317 B2* | 3/2022 | Kim | G06Q 10/101 |
| 11,316,859 B2* | 4/2022 | Kim | H04L 67/52 |
| 11,523,087 B2* | 12/2022 | Taylor | H04N 5/265 |
| 2004/0210515 A1 | 10/2004 | Hughes | |
| 2005/0040006 A1 | 2/2005 | Kodela et al. | |
| 2006/0242062 A1 | 10/2006 | Peterson et al. | |
| 2006/0242063 A1 | 10/2006 | Peterson et al. | |
| 2007/0100750 A1 | 5/2007 | Hartfield et al. | |
| 2008/0120232 A1 | 5/2008 | Herrin et al. | |
| 2009/0285392 A1* | 11/2009 | Leitheiser | G06Q 30/02 709/227 |
| 2010/0160032 A1 | 6/2010 | Paton | |
| 2010/0312705 A1 | 12/2010 | Caruso et al. | |
| 2011/0161835 A1* | 6/2011 | Karam | G06F 16/957 715/753 |
| 2011/0320347 A1 | 12/2011 | Tumminaro et al. | |
| 2013/0065666 A1 | 3/2013 | Schueller et al. | |
| 2014/0022328 A1* | 1/2014 | Gechter | G06Q 30/06 348/14.02 |
| 2014/0040085 A1 | 2/2014 | Angus | |
| 2014/0063174 A1* | 3/2014 | Junuzovic | G06Q 10/101 348/E7.083 |
| 2014/0122341 A1 | 5/2014 | Hawkins et al. | |
| 2015/0039504 A1 | 2/2015 | Ebbert | |
| 2016/0012375 A1* | 1/2016 | Hanson | G06Q 10/063114 705/7.15 |
| 2016/0275465 A1 | 9/2016 | Smith | |
| 2016/0295165 A1* | 10/2016 | Mizuhara | A61B 5/0022 |
| 2017/0003856 A1* | 1/2017 | Mande | G06Q 10/20 |
| 2018/0048864 A1* | 2/2018 | Taylor | G06Q 20/40145 |
| 2018/0048865 A1* | 2/2018 | Taylor | G06F 3/0488 |
| 2018/0121975 A1 | 5/2018 | Weinflash et al. | |
| 2018/0241930 A1* | 8/2018 | Eisses | H04N 23/62 |
| 2018/0367755 A1* | 12/2018 | Pranger | H04N 23/63 |
| 2019/0052840 A1* | 2/2019 | Taylor | G06F 3/04842 |
| 2019/0332661 A1* | 10/2019 | Halprin Limor | G06Q 40/08 |
| 2020/0036942 A1* | 1/2020 | Pranger | G06Q 20/042 |
| 2020/0128210 A1* | 4/2020 | Hatada | H04N 7/147 |
| 2020/0134637 A1* | 4/2020 | Srinivasan | G06Q 30/016 |
| 2020/0265426 A1 | 8/2020 | Furche et al. | |
| 2021/0014453 A1* | 1/2021 | Pranger | H04L 65/4025 |
| 2021/0064325 A1* | 3/2021 | Mossoba | G06F 3/1454 |
| 2021/0266500 A1* | 8/2021 | Taylor | G06Q 20/042 |
| 2021/0306286 A1* | 9/2021 | Anderson | H04L 51/02 |
| 2021/0326095 A1* | 10/2021 | Mossoba | H04M 7/0027 |
| 2021/0326482 A1* | 10/2021 | Sahgal | G06F 16/93 |
| 2021/0342798 A1 | 11/2021 | Hall et al. | |
| 2022/0004756 A1* | 1/2022 | Jennings | G06Q 20/047 |
| 2022/0020032 A1* | 1/2022 | Kim | H04L 63/0807 |
| 2022/0070170 A1* | 3/2022 | Kim | H04L 63/0281 |
| 2022/0222958 A1* | 7/2022 | Jennings | G06Q 30/012 |

* cited by examiner

SYSTEMS FOR PROVIDING ACCESS TO PERSONALIZED USER ENVIRONMENTS

CROSS-REFERENCE TO RELATED APPLICATION

This patent application claims the benefit of U.S. Provisional Application No. 63/233,541 filed on Aug. 16, 2021, the disclosure of which is incorporated herein by reference in its entirety.

TECHNOLOGICAL FIELD

An example embodiment relates generally to managing multiple user environments, and more particularly, to providing access to personalized user environments for facilitating multiple party interaction.

BACKGROUND

In order to optimize user experience, a user assisting another needs to have enough information relating to the other user's experience. Currently, assistance requires the user needing help to provide information about the issue, which can often be incomplete or incorrect. As such, there exists a need for a system that allows for a user assisting another to have access to a given user's specific information.

BRIEF SUMMARY

The following presents a summary of certain embodiments of the disclosure. This summary is not intended to identify key or critical elements of all embodiments nor delineate the scope of any or all embodiments. Its sole purpose is to present certain concepts and elements of one or more embodiments in a summary form as a prelude to the more detailed description that follows.

In an example embodiment, a system for providing access to personalized user environments is provided. The system includes at least one non-transitory storage device and at least one processing device coupled to the at least one non-transitory storage device. The at least one processing device is configured to generate a first party user environment associated with one or more users of a first party. The at least one processing device is also configured to generate a second party user environment associated with one or more users of a second party. The at least one processing device is further configured to cause rendering of the first party user environment to the one or more users of the first party associated with the first party user environment. The at least one processing device is still further configured to cause rendering of the second party user environment to the one or more users of the second party associated with the second party user environment. The at least one processing device is also configured to receive a second party viewing request from the first party user environment. The at least one processing device is further configured to cause rendering of the second party user environment within the first party user environment in response to receiving the second party viewing request.

In some embodiments, the at least one processing device is configured to generate a task for the second party user environment in response to an input into the first party user environment. In some embodiments, the second party user environment is configured to receive one or more documents relating to the second party. In some embodiments, the at least one processing device is configured to provide a help notification to the first party user environment in response to a help request from the second party user environment.

In some embodiments, the at least one processing device is configured to generate a third party user environment associated with one or more users of a third party. In such an embodiment, the third party is independent of the second party. In some embodiments, the at least one processing device is configured to cause rendering of the third party user environment user environment to the one or more users of the third party associated with the third party user environment; receive a third party viewing request from the first party user environment; and cause rendering of the third party user environment within the first party user environment in response to receiving the third party viewing request.

In some embodiments, the first party user environment can switch between the second party user environment and the third party user environment.

In another example embodiment, a computer program product for providing access to personalized user environments is provided. The computer program product includes at least one non-transitory computer-readable medium having computer-readable program code portions embodied therein. The computer-readable program code portions include an executable portion configured to generate a first party user environment associated with one or more users of a first party. The computer-readable program code portions also include an executable portion configured to generate a second party user environment associated with one or more users of a second party. The computer-readable program code portions further include an executable portion configured to cause rendering of the first party user environment to the one or more users of the first party associated with the first party user environment. The computer-readable program code portions still further include an executable portion configured to cause rendering of the second party user environment to the one or more users of the second party associated with the second party user environment. The computer-readable program code portions also include an executable portion configured to receive a second party viewing request from the first party user environment. The computer-readable program code portions further include an executable portion configured to cause rendering of the second party user environment within the first party user environment in response to receiving the second party viewing request.

In some embodiments, the computer-readable program code portions include an executable portion configured to generate a task for the second party user environment in response to an input into the first party user environment. In some embodiments, the second party user environment is configured to receive one or more documents relating to the second party. In some embodiments, the computer-readable program code portions include an executable portion configured to provide a help notification to the first party user environment in response to a help request from the second party user environment.

In some embodiments, the computer-readable program code portions include an executable portion configured to generate a third party user environment associated with one or more users of a third party. In such an embodiment, the third party is independent of the second party. In some embodiments, the computer-readable program code portions include an executable portion configured to cause rendering of the third party user environment user environment to the one or more users of the third party associated with the third party user environment; an executable portion configured to receive a third party viewing request from the first party user environment; and an executable portion configured to cause rendering of the third party user environment within the first party user environment in response to receiving the third party viewing request.

In some embodiments, the first party user environment can switch between the second party user environment and the third party user environment.

In still another example embodiment, a computer-implemented method for providing access to personalized user environments is provided. The method includes generating a first party user environment associated with one or more users of a first party. The method also includes generating a second party user environment associated with one or more users of a second party. The method further includes causing rendering of the first party user environment to the one or more users of the first party associated with the first party user environment. The method still further includes causing rendering of the second party user environment to the one or more users of the second party associated with the second party user environment. The method also includes receiving a second party viewing request from the first party user environment. The method further includes causing rendering of the second party user environment within the first party user environment in response to receiving the second party viewing request.

In some embodiments, the method also includes generating a task for the second party user environment in response to an input into the first party user environment. In some embodiments, the second party user environment is configured to receive one or more documents relating to the second party. In some embodiments, the method includes providing a help notification to the first party user environment in response to a help request from the second party user environment.

In some embodiments, the method includes generating a third party user environment associated with one or more users of a third party. In such an embodiment, the third party is independent of the second party. In some embodiments, the method includes causing rendering of the third party user environment user environment to the one or more users of the third party associated with the third party user environment; receiving a third party viewing request from the first party user environment; and causing rendering of the third party user environment within the first party user environment in response to receiving the third party viewing request.

Embodiments of the present disclosure address the above needs and/or achieve other advantages by providing apparatuses (e.g., a system, computer program product and/or other devices) and methods for dynamically generating optimized data queries to improve hardware efficiency and utilization. The system embodiments may comprise one or more memory devices having computer readable program code stored thereon, a communication device, and one or more processing devices operatively coupled to the one or more memory devices, wherein the one or more processing devices are configured to execute the computer readable program code to carry out said embodiments. In computer program product embodiments of the disclosure, the computer program product comprises at least one non-transitory computer readable medium comprising computer readable instructions for carrying out said embodiments. Computer implemented method embodiments of the disclosure may comprise providing a computing system comprising a computer processing device and a non-transitory computer readable medium, where the computer readable medium comprises configured computer program instruction code, such that when said instruction code is operated by said computer processing device, said computer processing device performs certain operations to carry out said embodiments.

BRIEF DESCRIPTION OF THE DRAWINGS

Figure 1:
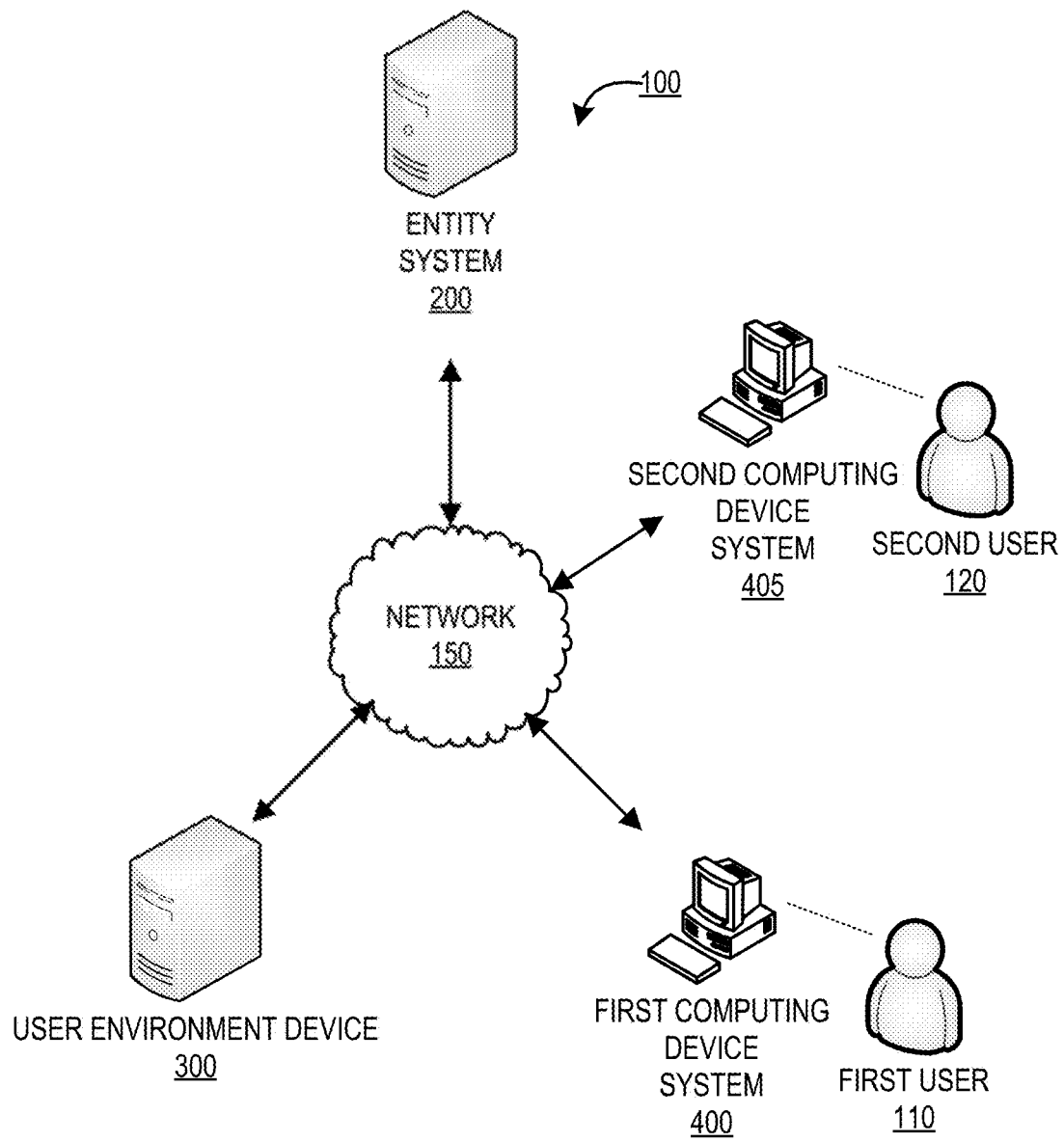
Figure 2:
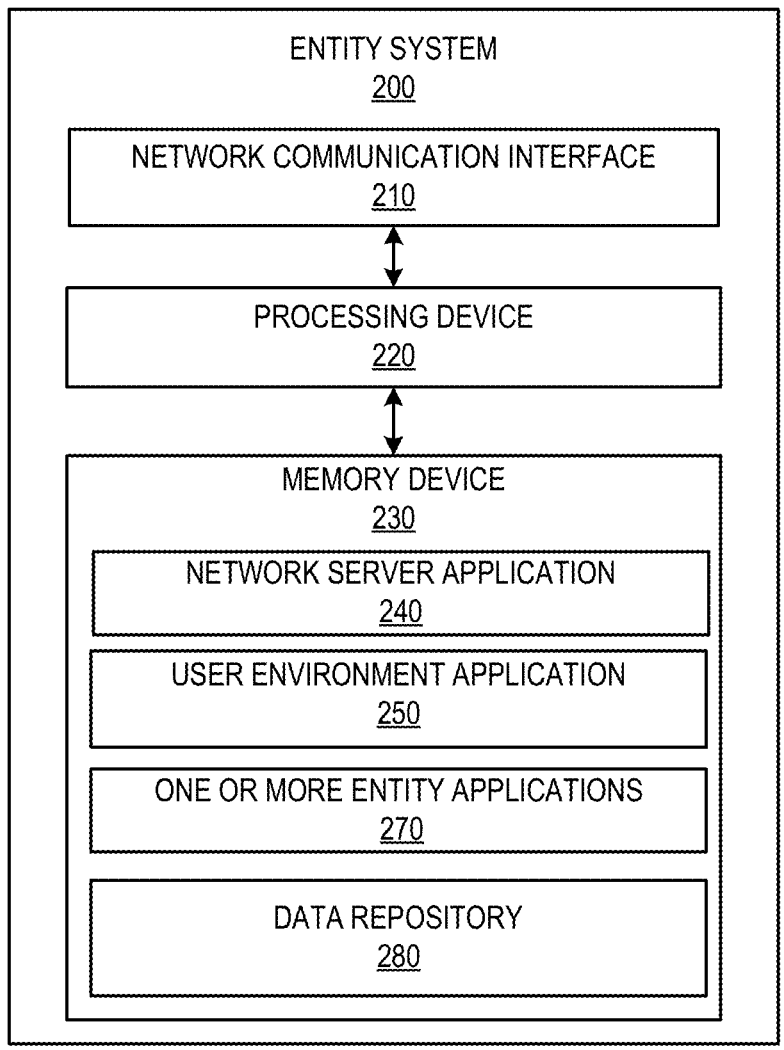
Figure 3:
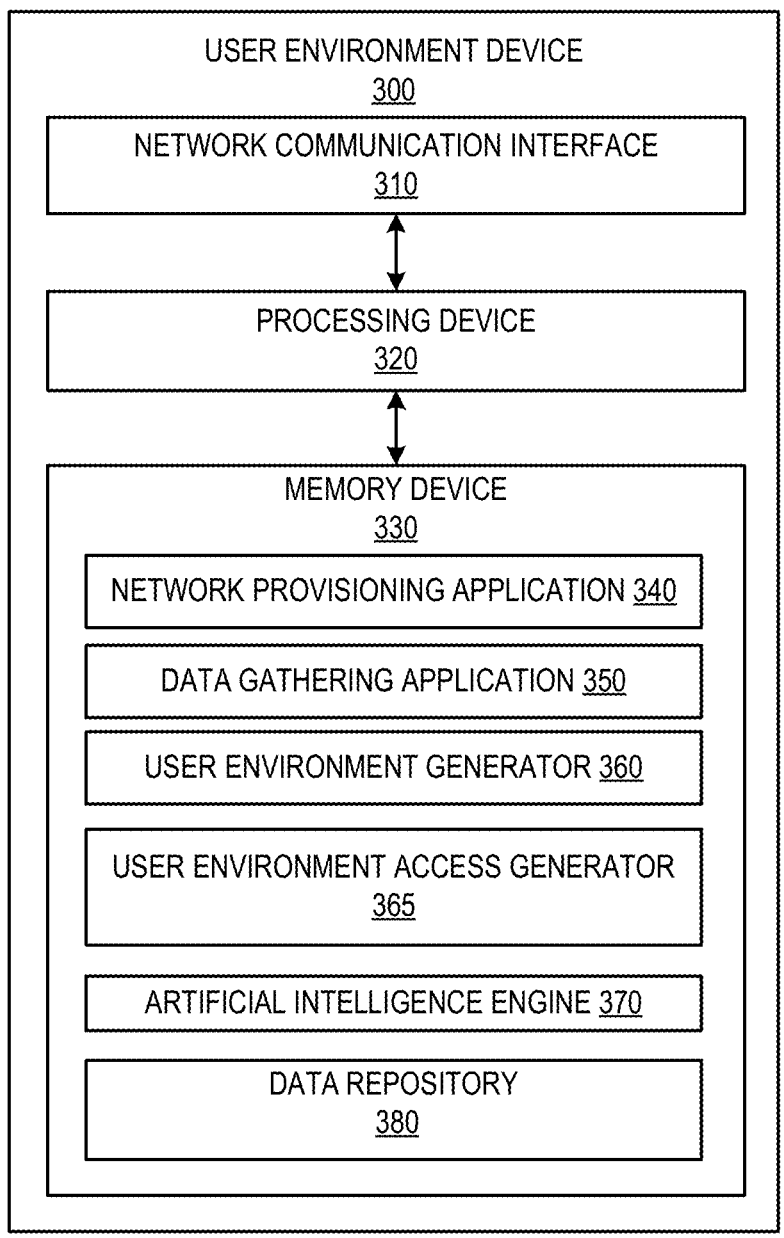
Figure 4:
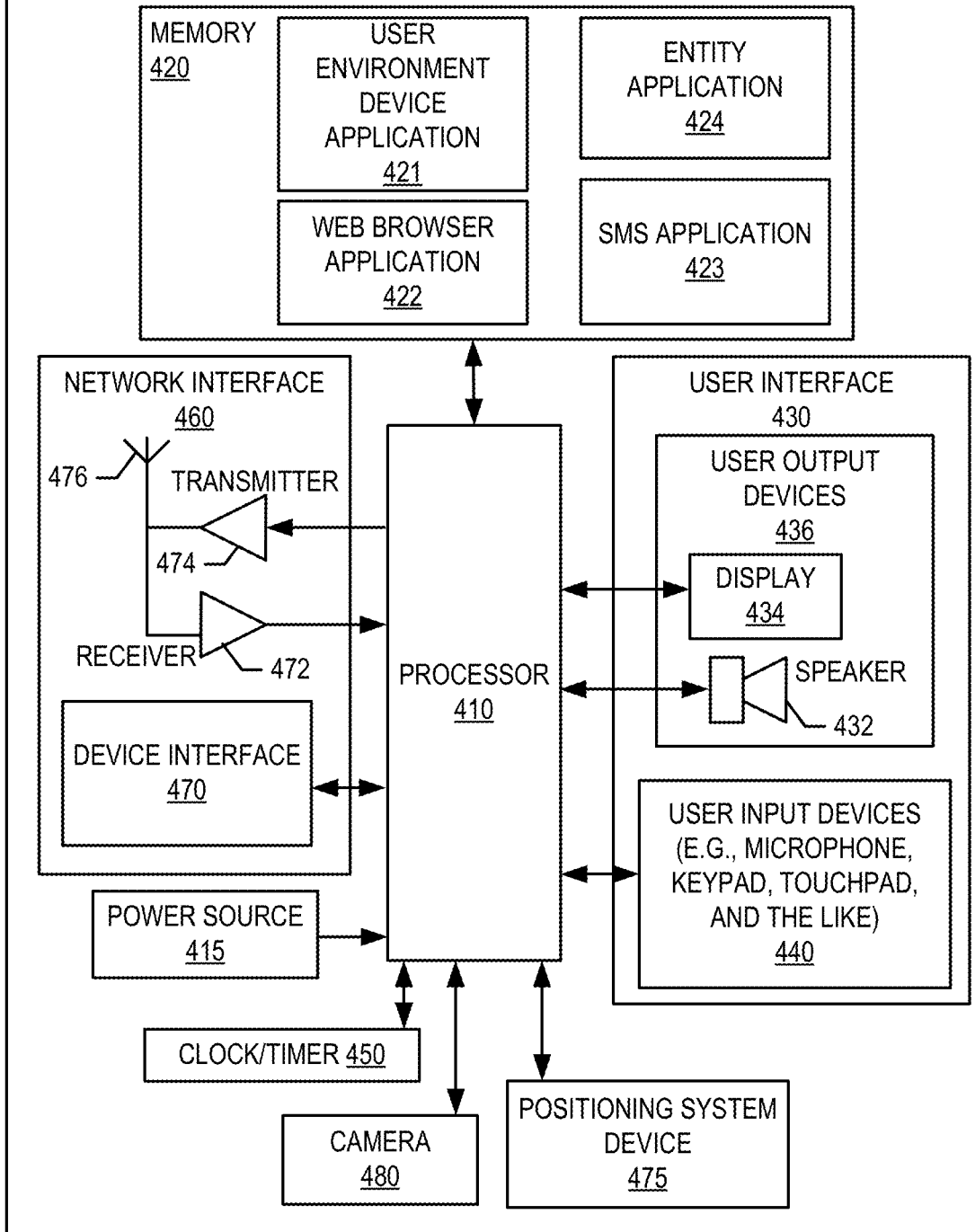
Figure 5:
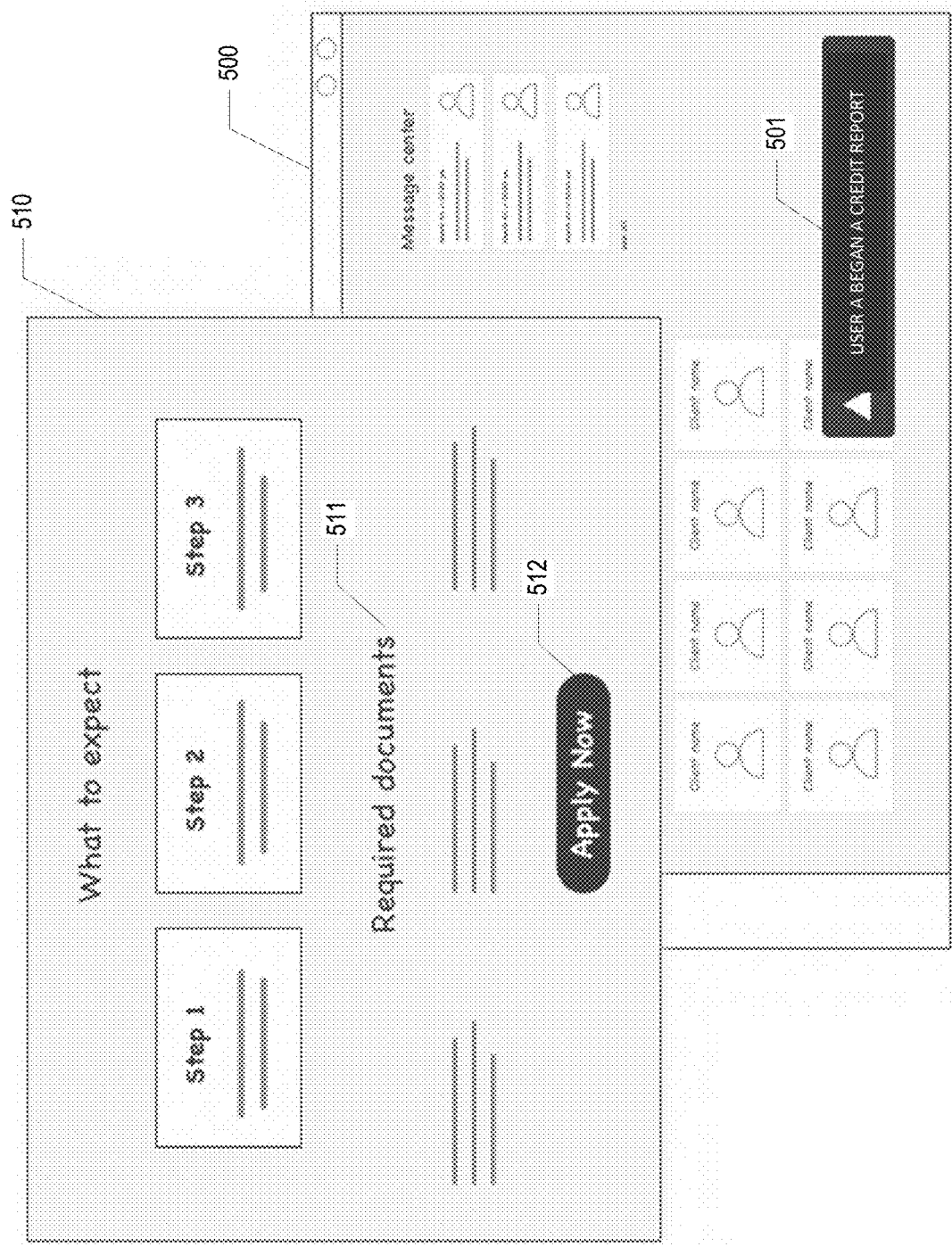
Figure 6:
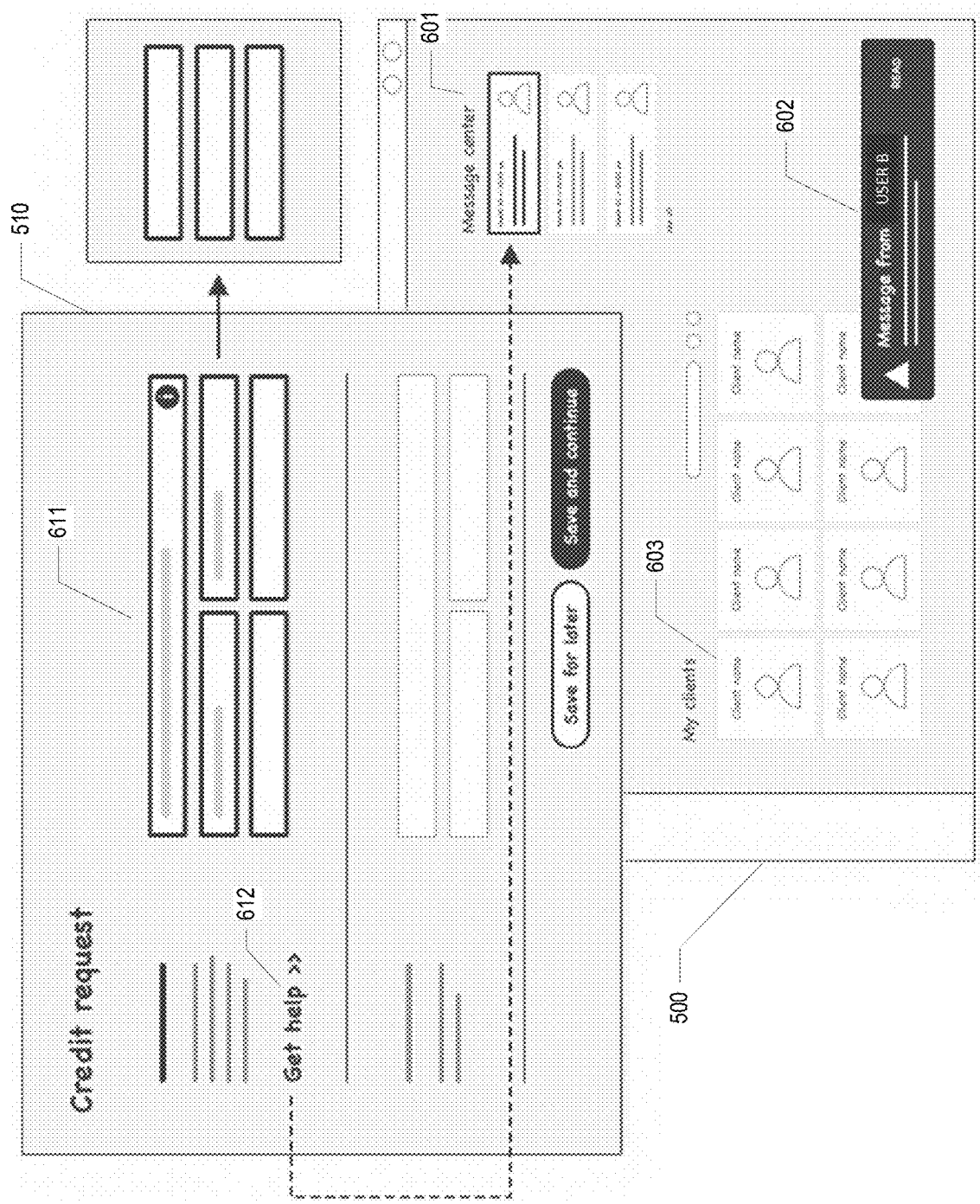
Figure 7:
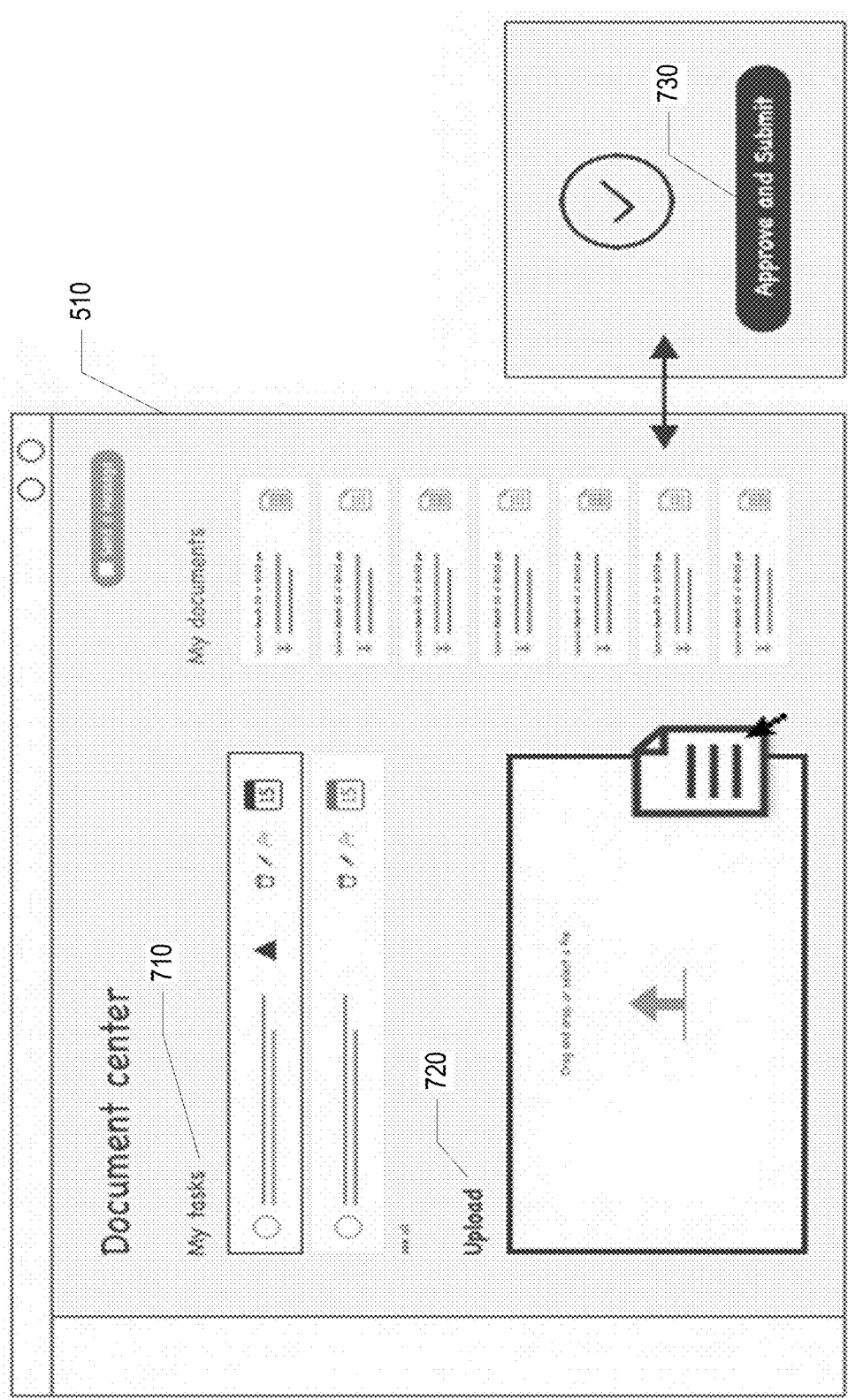
Figure 8:
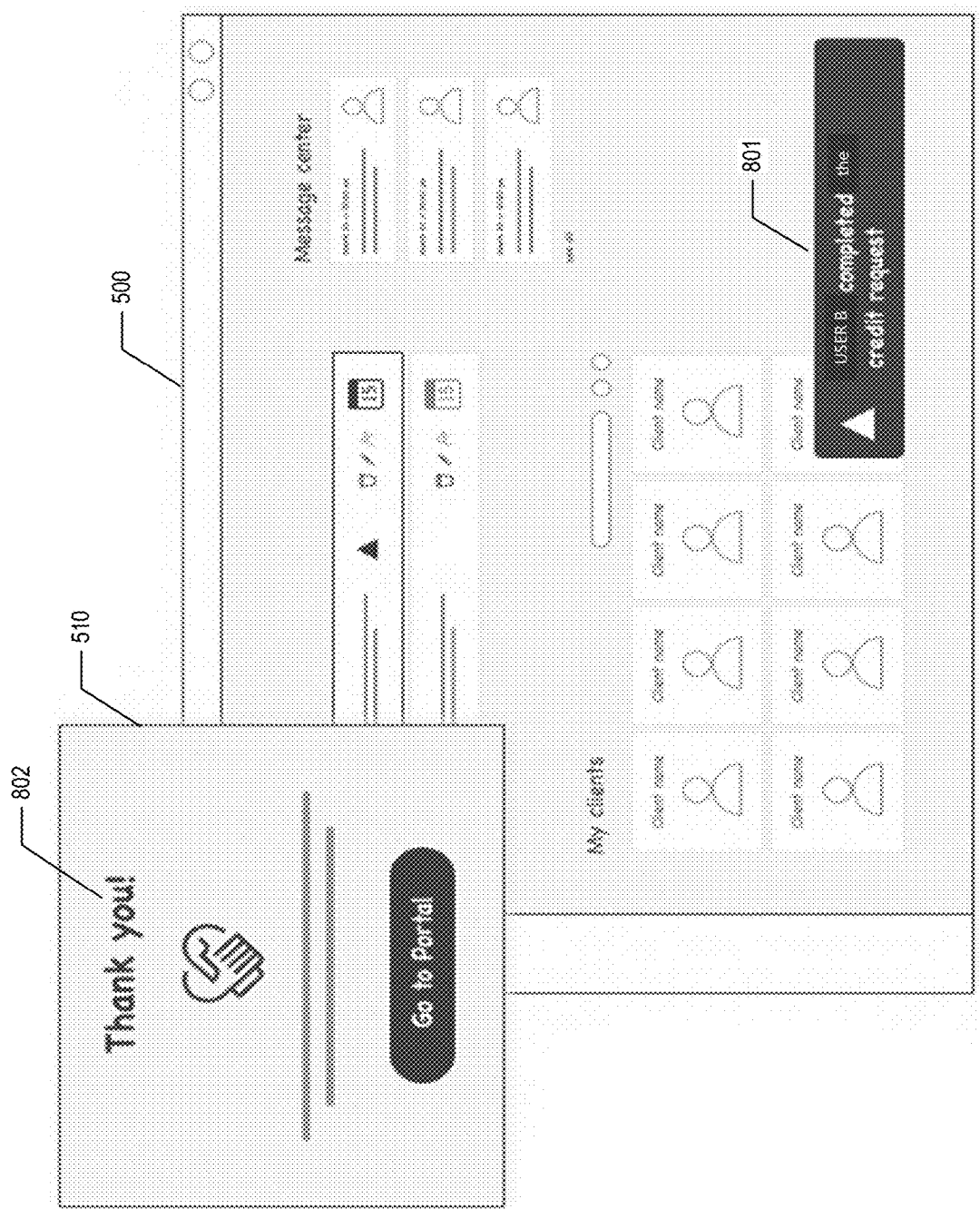
Figure 9:
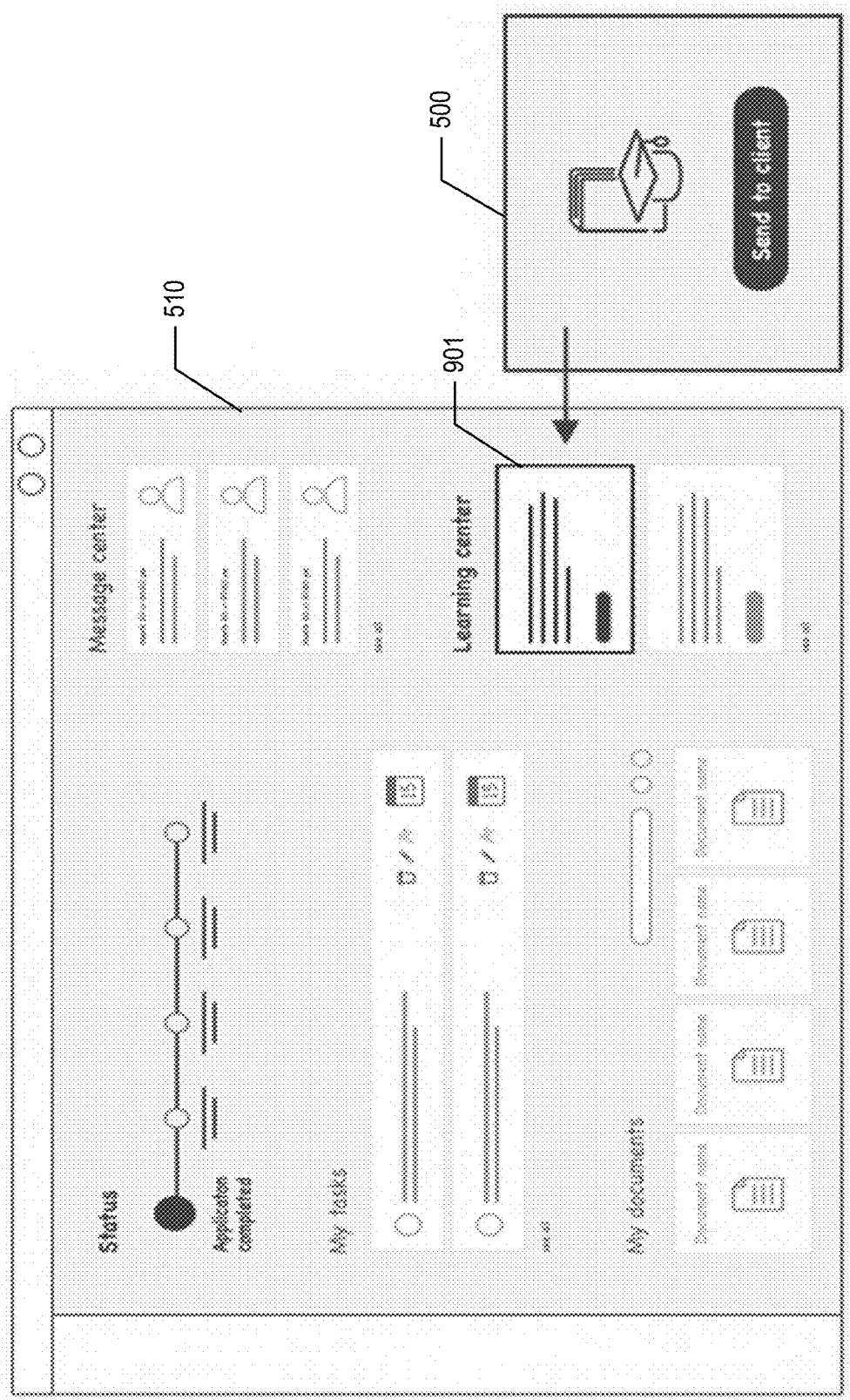
Figure 10:
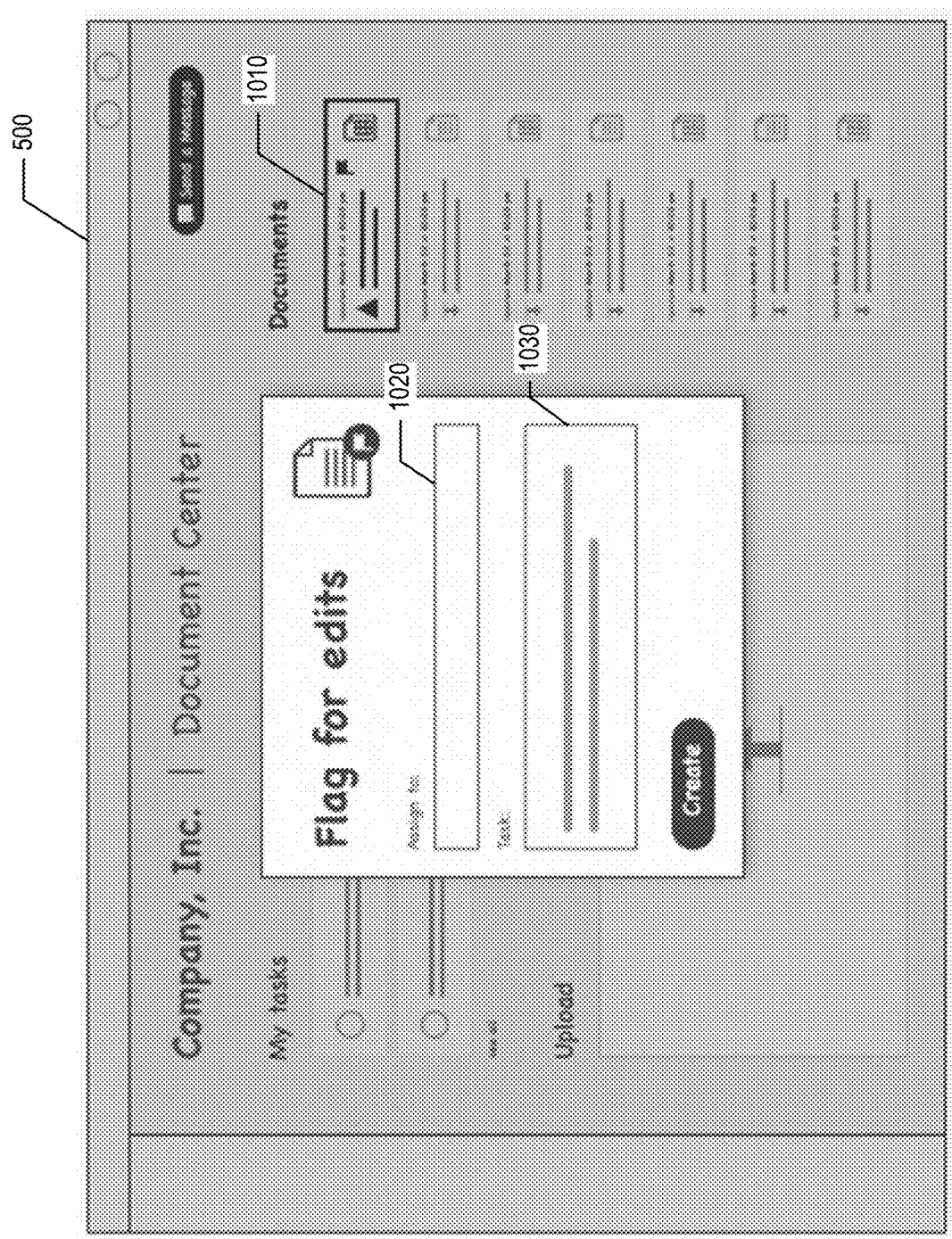
Figure 11:
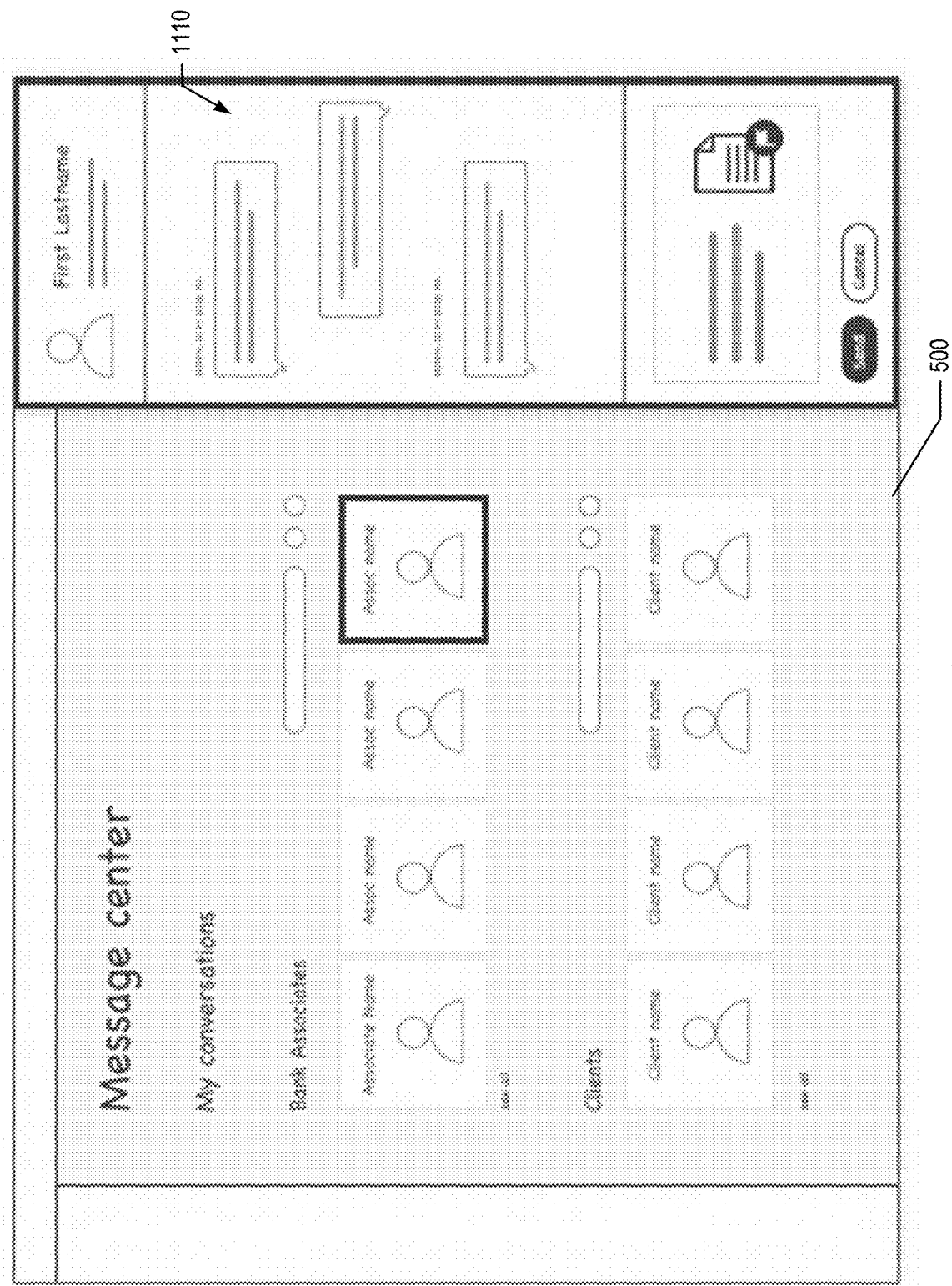
Figure 12:
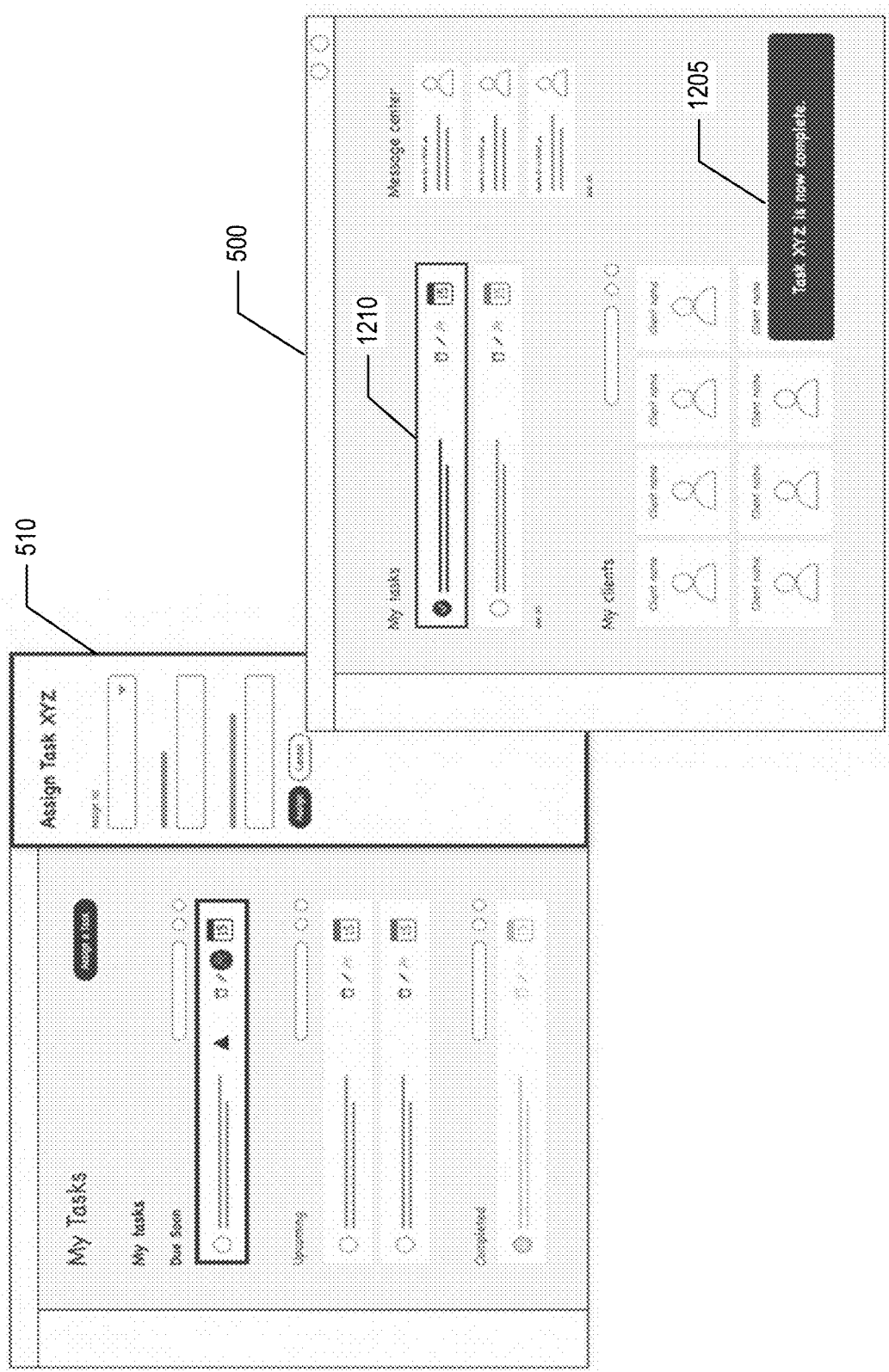
Figure 13:
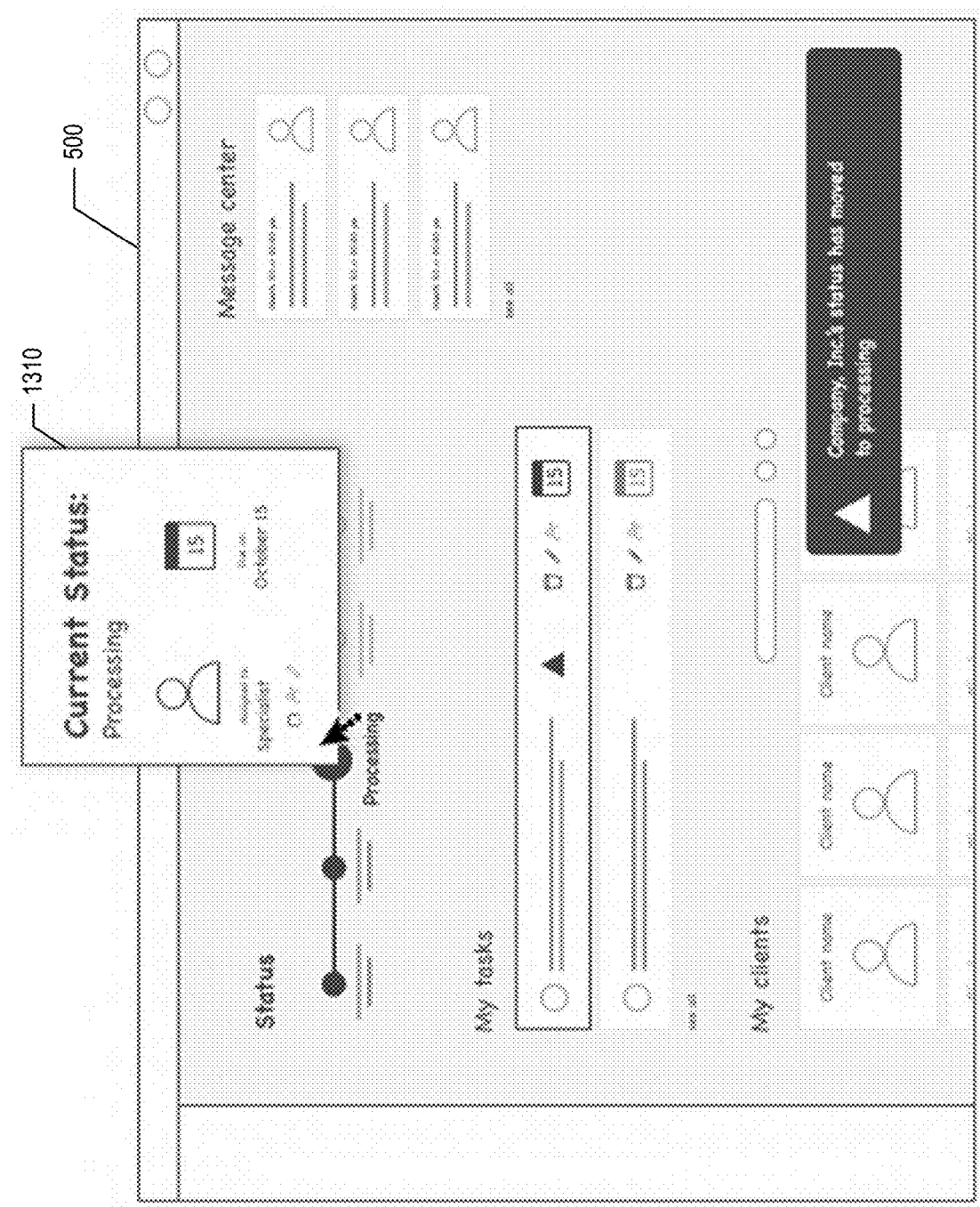
Figure 14:
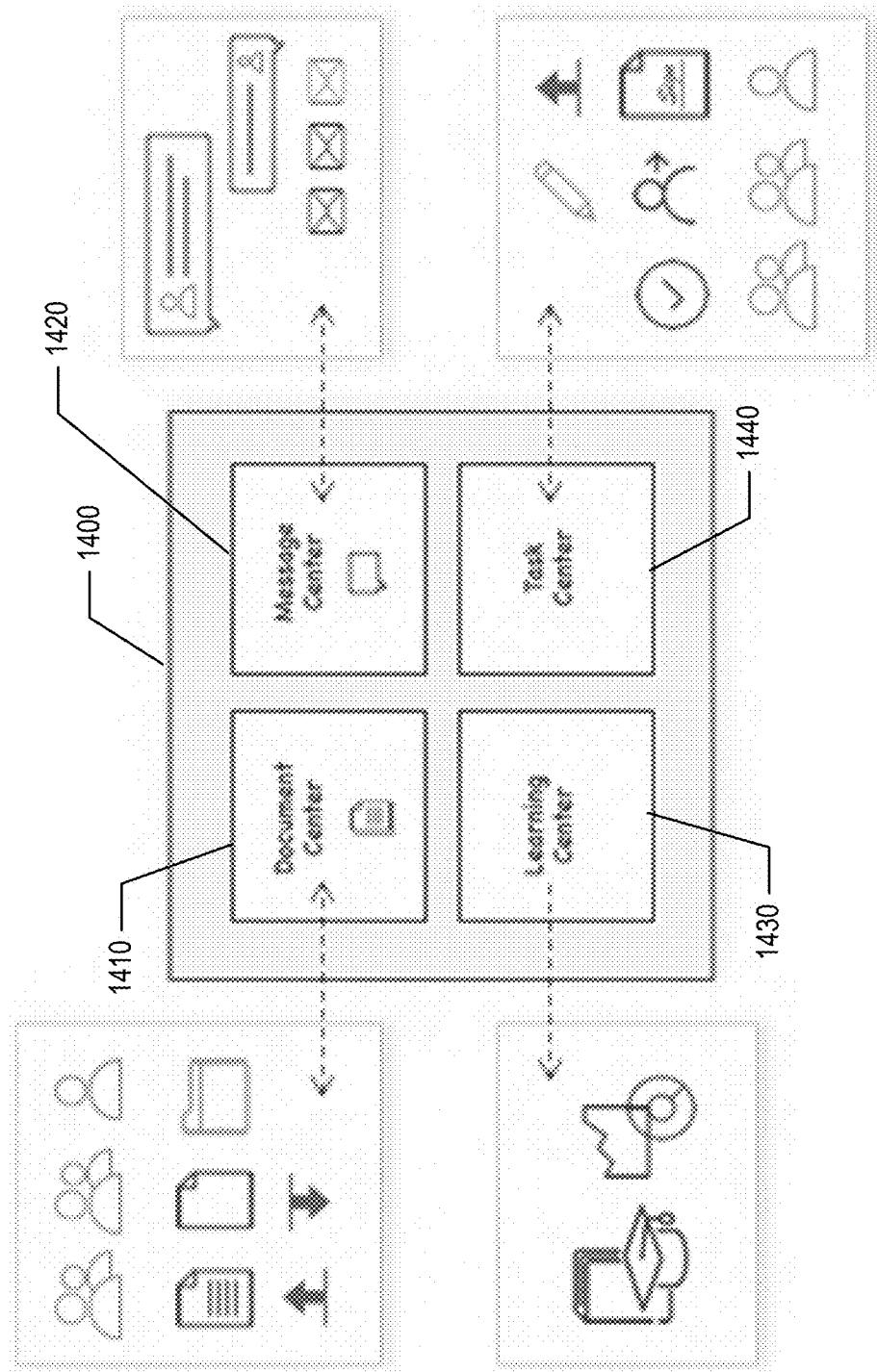
Figure 15:
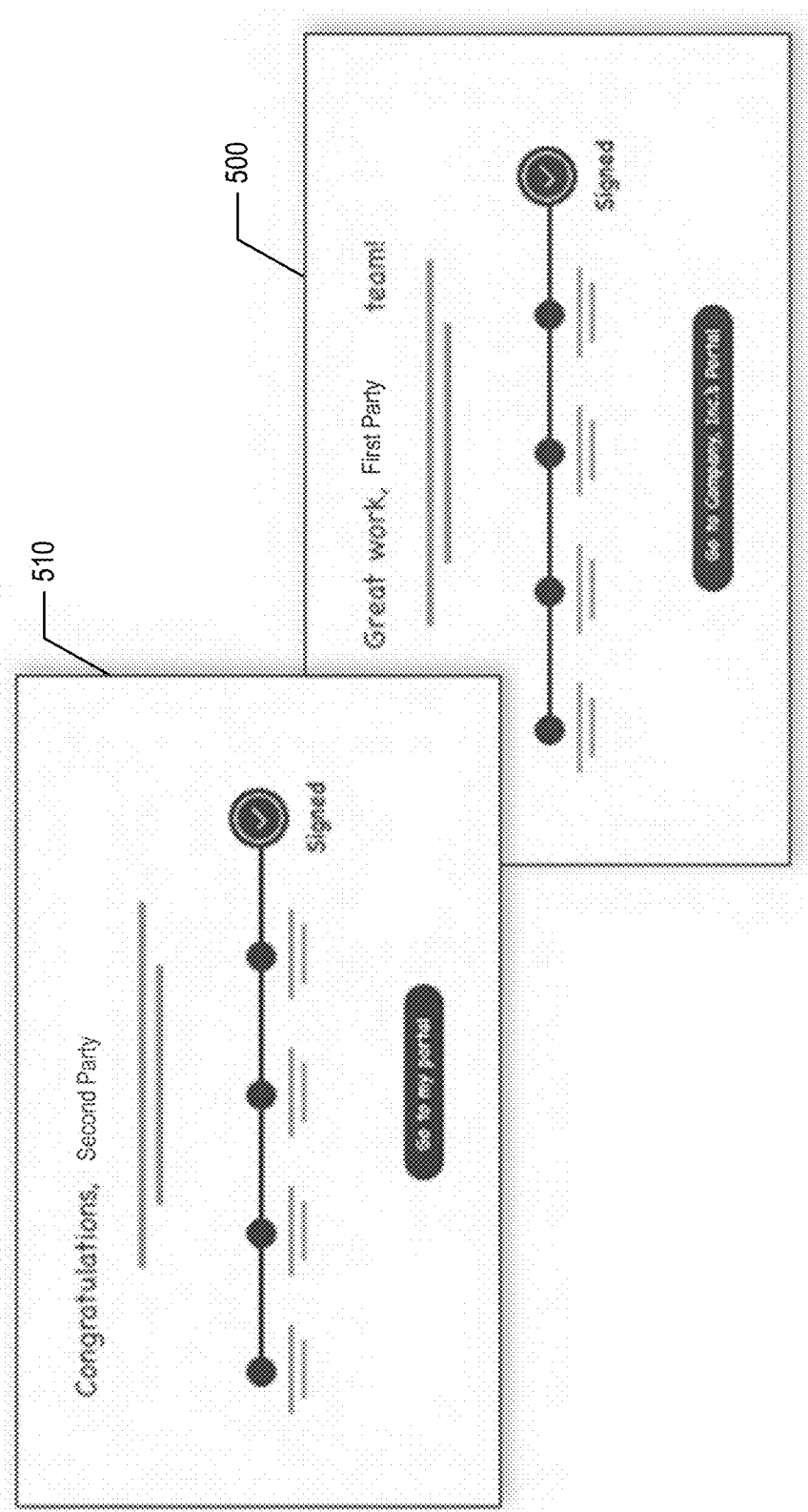
Figure 16:
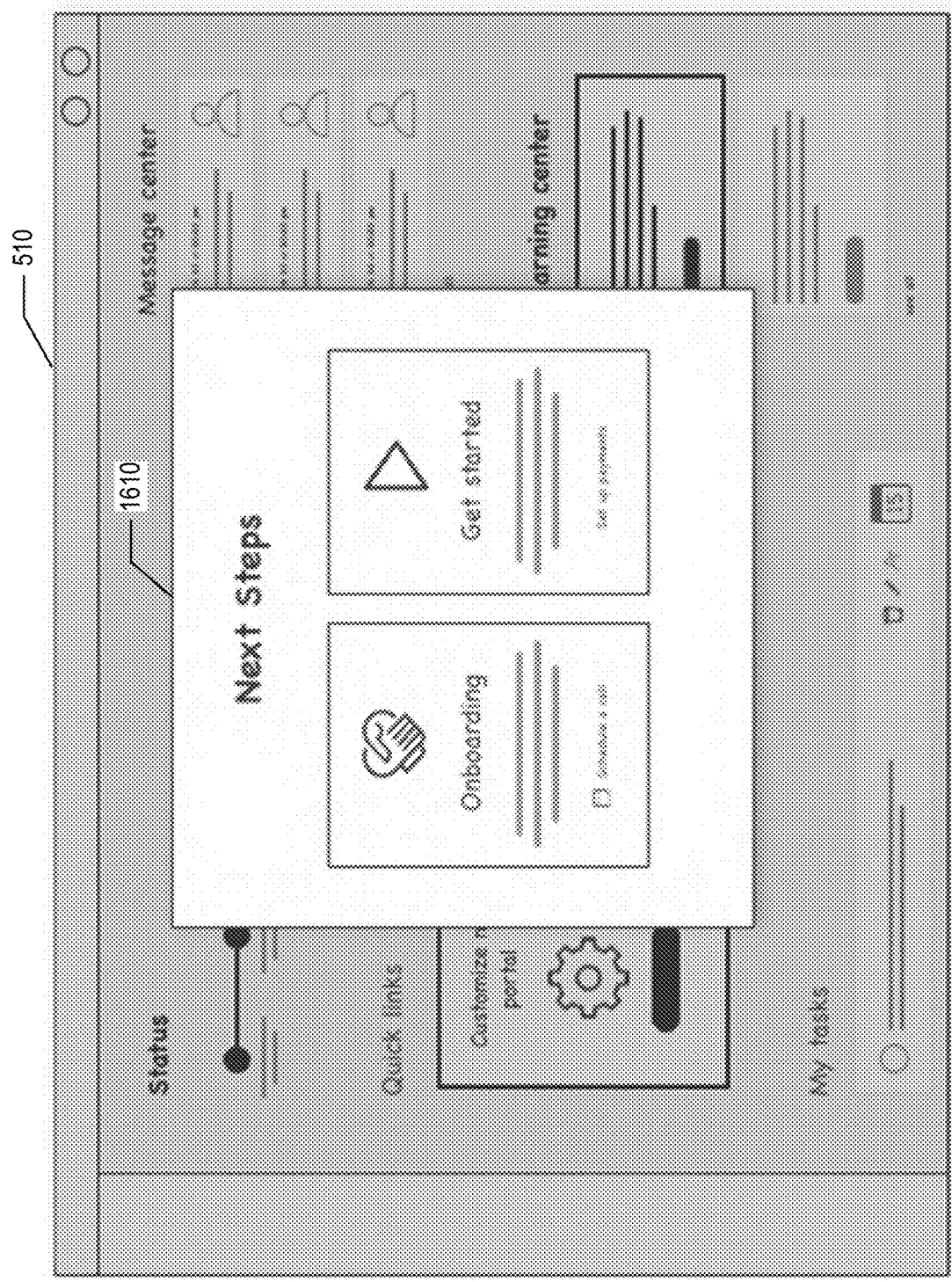
Figure 17:
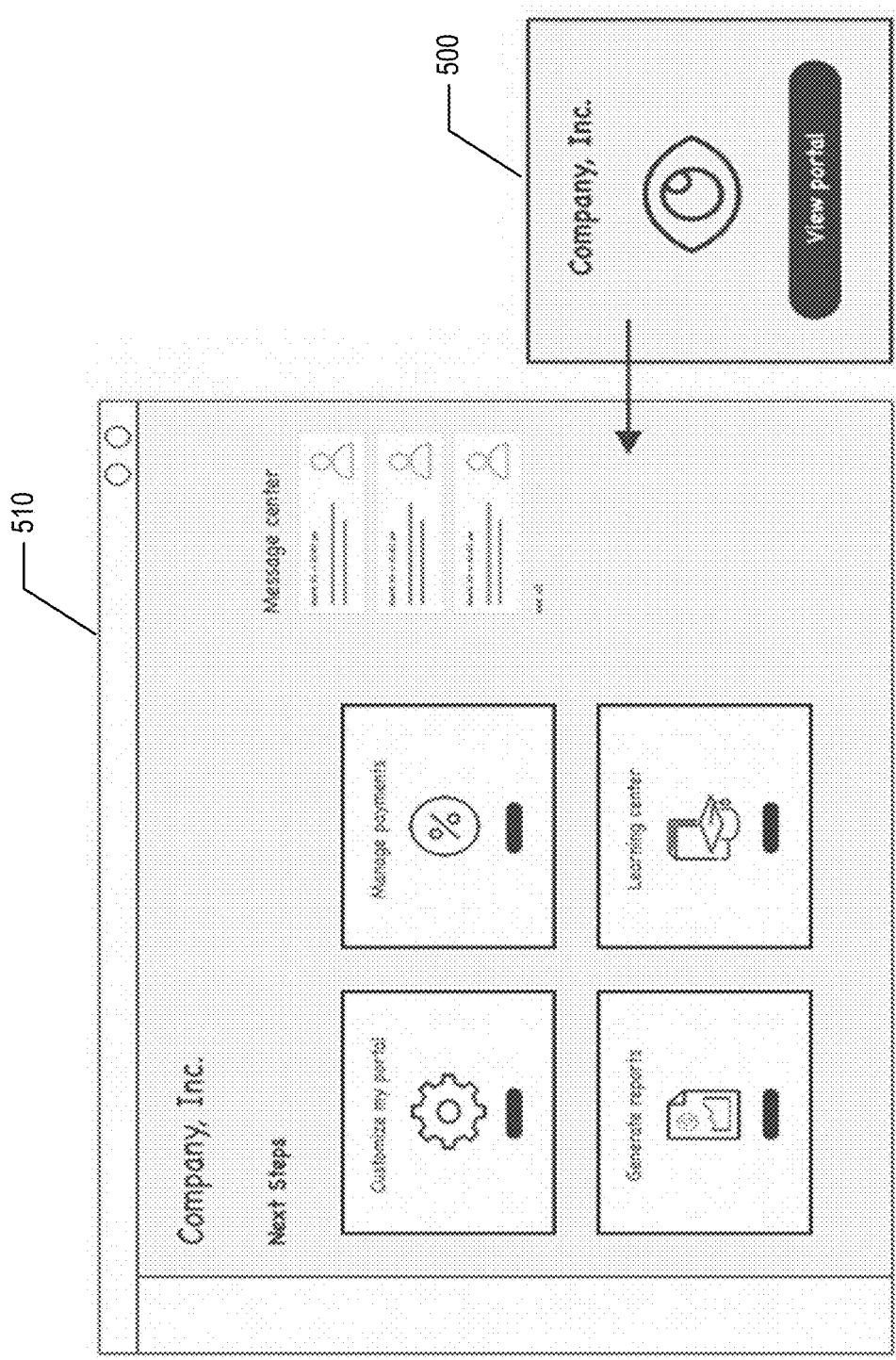
Figure 18:
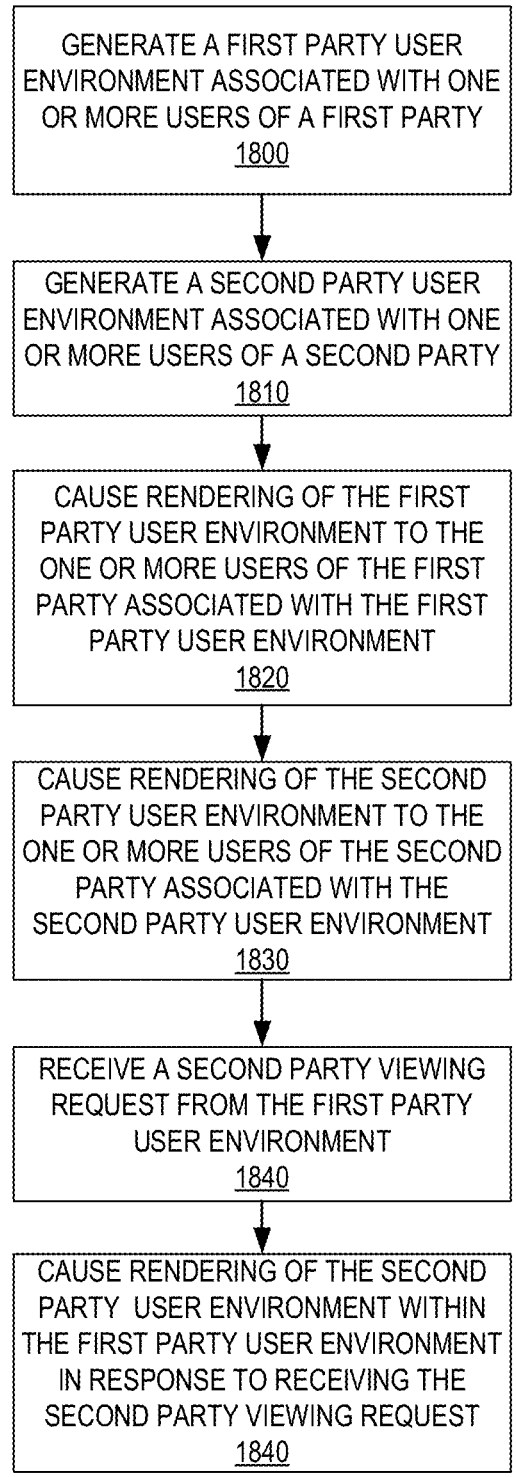
Figure 19:
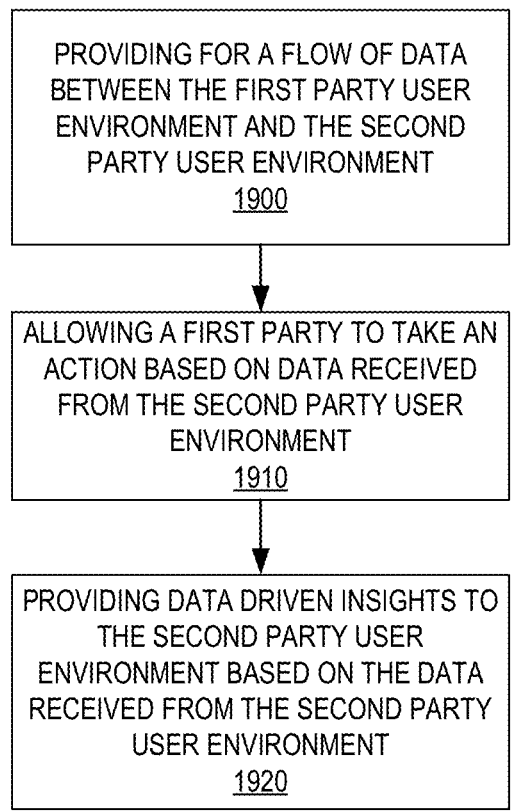

Having thus described embodiments of the disclosure in general terms, reference will now be made the accompanying drawings, wherein:

FIG. 1 provides a block diagram illustrating a system environment for providing access to personalized user environments, in accordance with embodiments of the present disclosure;

FIG. 2 provides a block diagram illustrating the entity system 200 of FIG. 1, in accordance with embodiments of the present disclosure;

FIG. 3 provides a block diagram illustrating a user environment device 300 of FIG. 1, in accordance with embodiments of the present disclosure;

FIG. 4 provides a block diagram illustrating the first computing device system 400 or the second computing device system 405 of FIG. 1, in accordance with embodiments of the present disclosure;

FIG. 5 provides an example first party user environment and an example second party user environment, in accordance with embodiments of the present disclosure;

FIG. 6 illustrates the first party user environment and the second party user environment in an instance in which the second party user environment prompts a user of the second party to input second party information in accordance with embodiments of the present disclosure;

FIG. 7 illustrates the second party user environment in an instance in which the second party user environment is configured to upload one or more documents relating to the second party in accordance with embodiments of the present disclosure;

FIG. 8 illustrates the first party user environment and the second party user environment in an instance in which a user of the second party has submitted one or more documents via the second party user environment in accordance with embodiments of the present disclosure;

FIG. 9 illustrates the first party user environment and the second party user environment in an instance in which a user of the first party selects education content to send to the second party user environment via the first party user environment in accordance with embodiments of the present disclosure;

FIG. 10 illustrates the first party user environment in an instance in which one of the documents submitted by the second party user environment needs to be updated or replaced in accordance with embodiments of the present disclosure;

FIG. 11 illustrates a communication function of the first party user environment for communication between users of the first party in accordance with embodiments of the present disclosure;

FIG. 12 illustrates the first party user environment and the second party user environment in an instance in which a user of the second party reassigns a tasks to another user of the second party and said task is completed, in accordance with embodiments of the present disclosure;

FIG. 13 illustrates a status checking function of the first party user environment in accordance with embodiments of the present disclosure;

FIG. 14 illustrates a status window 1400 viewable by one or more users of the first party and/or the second party in accordance with embodiments of the present disclosure;

FIG. 15 illustrates the first party user environment and the second party user environment in an instance in which the approval process is completed in accordance with embodiments of the present disclosure;

FIG. 16 illustrates the second party user environment after completion of the approval process in accordance with embodiments of the present disclosure;

FIG. 17 illustrates additional interaction between the first party user environment and the second party user environment after completion of the approval process in accordance with embodiments of the present disclosure;

FIG. 18 provides a flowchart illustrating a method of providing access to personalized user environments in accordance with embodiments of the present disclosure; and FIG. 19 provides a flowchart illustrating data flow between different party user environments used in various embodiments of the present disclosure.

DETAILED DESCRIPTION

Embodiments of the present disclosure will now be described more fully hereinafter with reference to the accompanying drawings, in which some, but not all, embodiments of the present disclosure are shown. Indeed, the present disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that utilizes one or more entity resources, including, but not limited to, one or more entity systems, one or more entity databases, one or more applications, one or more servers, or the like to perform one or more organization activities associated with the entity. In some embodiments, an entity may be any organization that develops, maintains, utilizes, and/or controls one or more applications and/or databases. Applications as described herein may be any software applications configured to perform one or more operations of the entity. Databases as described herein may be any datastores that store data associated with organizational activities associated with the entity. In some embodiments, the entity may be a financial institution which may include herein may include any financial institutions such as commercial banks, thrifts, federal and state savings banks, savings and loan associations, credit unions, investment companies, insurance companies and the like. In some embodiments, the financial institution may allow a customer to establish an account with the financial institution. In some embodiments, the entity may be a non-financial institution.

Many of the example embodiments and implementations described herein contemplate interactions engaged in by a user with a computing device and/or one or more communication devices and/or secondary communication devices.

A "user", as referenced herein, may refer to an entity or individual that has the ability and/or authorization to access and use one or more applications provided by the entity and/or the system of the present disclosure. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "machine learning algorithms" may refer to programs (math and logic) that are configured to self-adjust and perform better as they are exposed to more data. To this extent, machine learning algorithms are capable of adjusting their own parameters, given feedback on previous performance in making prediction about a dataset. Machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable form of machine learning algorithm.

As used herein, "machine learning model" may refer to a mathematical model generated by machine learning algorithms based on sample data, known as training data, to make predictions or decisions without being explicitly programmed to do so. The machine learning model represents what was learned by the machine learning algorithm and represents the rules, numbers, and any other algorithm-specific data structures required to for classification.

In order to help facilitate transactions between parties, various portals are often provided for users of each party to request and/or provide information in order for the transaction or interaction to be completed. Each portal can be different, based on role and access within an interaction or transaction. Therefore, it can be difficult for one user to assist another in an instance the other user is having issues. Typically, the assisting user of a first party (e.g., a bank employee) would have to receive information about the issues of the user of a second party (e.g., a customer) from the user of the second party themselves. For example, the user of the second party may be required to explain the situation, resulting in incomplete or inaccurate information, which in turn makes it more difficult for the user of the first party to assist the user of the second party.

The present disclosure is directed to a system that allows one or more users of the first party to toggle between a first party user environment associated with the first party and a second party user environment associated with the second party. The systems discussed herein allow for user interface environments to be personalized for a given user. As discussed, each party may have one or more party users that have varying levels of access to information relating to a given transaction or interaction. For example, a user with a higher ranking in a company may have more access to information than a lower ranking user. Therefore, each party may have one or more user environments with information specifically relating to a given user. Alternatively, a given party may have a single user environment accessible by one or more users of the party.

In order to facilitate interactions more efficiently, systems discussed herein allow for one or more users of the first party to access both the first party user environment, as well as the second party user environment. For example, a bank employee may be able to access the user environment of a customer in addition to said bank employee's user environment. The systems discussed herein allow for increased interaction between user environments, while maintaining security measures necessary for a given field.

FIG. 1 provides a block diagram illustrating a system environment 100 for providing access to personalized user environments, in accordance with an embodiment of the present disclosure. As illustrated in FIG. 1, the environment 100 includes a user environment device 300, an entity system 200, and at least a first computing device system 400 and a second computing device system 405. One or more users (e.g., first user 110, second user 120, etc.) may be included in the system environment 100, where the users interact with the other entities of the system environment 100 via a user interface of a computing device system (e.g., first computing device system 400 and/or second computing device system 405). In some embodiments, the one or more user(s) (e.g., first user 110) of the system environment 100 may be employees (e.g., application developers, database administrators, application owners, application end users, business analysts, finance agents, or the like) of an entity associated with the entity system 200. In some embodiments, one or more user(s) (e.g., second user 120) of the system environment 100 may be customer or other third party of an entity associated with the entity system 200. For example, the second user may be a customer facilitating the transaction with an entity associated with the entity system 200.

The entity system(s) 200 may be any system owned or otherwise controlled by an entity to support or perform one or more process steps described herein. In some embodiments, the entity is a financial institution. In some embodiments, the entity may be a non-financial institution. In some embodiments, the entity may be any organization that utilizes one or more entity resources to perform one or more organizational activities.

The user environment device 300 is a system of the present disclosure for performing one or more process steps described herein. In some embodiments, the user environment device 300 may be an independent system. In some embodiments, the user environment device 300 may be a part of the entity system 200. For example, the method of FIG. 18 may be carried out by the entity system 200, the user environment device 300, the first computing device system 400, the second computing device system 405, and/or a combination thereof.

The user environment device 300, the entity system 200, and the computing device systems 400, 405 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the user environment device 300 is configured to communicate information or instructions with the entity system 200, and/or the computing device system 400 across the network 150. While the entity system 200, the user environment device 300, and the computing device systems 400, 405 are illustrated as separate components communicating via network 150, one or more of the components discussed here may be carried out via the same system (e.g., a single system may include the entity system 200 and the user environment device 300).

The first computing device system 400 may be a system owned or controlled by the entity of the entity system 200 and/or the first user 110 (e.g., a first party as discussed in reference to FIG. 18). As such, the first computing device system 400 may be a computing device of the first user 110. In general, the first computing device system 400 communicates with the first user 110 via a user interface of the first computing device system 400, and in turn is configured to communicate information or instructions with the user environment device 300, and/or entity system 200 across the network 150. As discussed herein, one or more user environments can be provided to the user interface of the first computing device system 400.

The second computing device system 405 may be a system owned or controlled by the entity of the entity system 200 and/or the second user 120 (e.g., a second party as discussed in reference to FIG. 18). As such, the second computing device system 405 may be a computing device of the second user 120. In general, the second computing device system 405 communicates with the second user 120 via a user interface of the second computing device system 405, and in turn is configured to communicate information or instructions with the user environment device 300, and/or entity system 200 across the network 150. As discussed herein, one or more user environments can be provided to the user interface of the second computing device system 405.

FIG. 2 provides a block diagram illustrating the entity system 200, in greater detail, in accordance with embodiments of the disclosure. As illustrated in FIG. 2, in one embodiment, the entity system 200 includes one or more processing devices 220 operatively coupled to a network communication interface 210 and a memory device 230. In certain embodiments, the entity system 200 is operated by a first entity, such as a financial institution. In some embodiments, the entity system 200 may be a multi-tenant cluster storage system.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a user environment application 250, one or more entity applications 270, and a data repository 280 comprising data accessed, retrieved, and/or computed by the entity system 200. The one or more entity applications 270 may be any applications developed, supported, maintained, utilized, and/or controlled by the entity. The computer-executable program code of the network server application 240, the user environment application 250, the one or more entity application 270 to perform certain logic, data-extraction, and data-storing functions of the entity system 200 described herein, as well as communication functions of the entity system 200.

The network server application 240, the user environment application 250, and the one or more entity applications 270 are configured to store data in the data repository 280 or to use the data stored in the data repository 280 when communicating through the network communication interface 210 with the user environment device 300, and/or the computing device systems 400, 405 to perform one or more process steps described herein. In some embodiments, the entity system 200 may receive instructions from the user environment device 300 via the user environment application 250 to perform certain operations. The user environment application 250 may be provided by the user environment device 300. The one or more entity applications 270 may be any of the applications used, created, modified, facilitated, and/or managed by the entity system 200.

FIG. 3 provides a block diagram illustrating the user environment device 300 in greater detail, in accordance with various embodiments. As illustrated in FIG. 3, in one embodiment, the user environment device 300 includes one or more processing devices 320 operatively coupled to a network communication interface 310 and a memory device 330. In certain embodiments, the user environment device 300 is operated by an entity, such as a financial institution. In some embodiments, the user environment device 300 is owned or operated by the entity of the entity system 200. In some embodiments, the user environment device 300 may be an independent system. In alternate embodiments, the user environment device 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the user environment device 300 described herein. For example, in one embodiment of the user environment device 300, the memory device 330 includes, but is not limited to, a network provisioning application 340, a data gathering application 350, a user environment generator 360, a user environment access generator 365, an artificial intelligence engine 370, and a data repository 380 comprising any data processed or accessed by one or more applications in the memory device 330. The computer-executable program code of the network provisioning application 340, the data gathering application 350, the user environment generator 360, the user environment access generator 365, and the artificial intelligence engine 370 may instruct the processing device 320 to perform certain logic, data-processing, and data-storing functions of the user environment device 300 described herein, as well as communication functions of the user environment device 300.

The network provisioning application 340, the data gathering application 350, the user environment generator 360, the user environment access generator 365, and the artificial intelligence engine 370 are configured to invoke or use the data in the data repository 380 when communicating through the network communication interface 310 with the entity system 200, the first computing device system 400, and/or the second computing device system 405. In some embodiments, the network provisioning application 340, the data gathering application 350, the user environment generator 360, the user environment access generator 365, and the artificial intelligence engine 370 may store the data extracted or received from the entity system 200, and the computing device systems 400, 405 in the data repository 380. In some embodiments, the network provisioning application 340, the data gathering application 350, the user environment generator 360, the user environment access generator 365, and the artificial intelligence engine 370 may be a part of a single application.

FIG. 4 provides a block diagram illustrating a computing device system, such as the first computing device system 400 and/or the second computing device system 405 of FIG. 1 in more detail, in accordance with various embodiments. However, it should be understood that a mobile telephone is merely illustrative of one type of computing device system 400, 405 that may benefit from, employ, or otherwise be involved with embodiments of the present disclosure and, therefore, should not be taken to limit the scope of embodiments of the present disclosure. Other types of computing devices may include portable digital assistants (PDAs), pagers, mobile televisions, electronic media devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device systems 400, 405 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system(s) 400, 405. For example, the processor 410 may include a digital signal processor device, a microprocessor device, and various analog to digital converters, digital to analog converters, and/or other support circuits. Control and signal processing functions of the computing device system(s) 400, 405 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system(s) 400, 405 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system(s) 400, 405 may be configured to operate with one or more air interface standards, communication protocols, modulation types, and access types. By way of illustration, the computing device system(s) 400, 405 may be configured to operate in accordance with any of a number of first, second, third, and/or fourth-generation communication protocols and/or the like.

As described above, each of the first computing device system 400 and the second computing device system 405 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system(s) 400, 405 to receive data from a user such as the first user 110 or the second user 120, may include any of a number of devices allowing the computing device system(s) 400, 405 to receive data from the user(s) 110, 120, such as a keypad, keyboard, touch-screen, touchpad, microphone, mouse, joystick, other pointer device, button, soft key, and/or other input device(s). The user interface may also include a camera 480, such as a digital camera.

The computing device system(s) 400, 405 may also include a positioning system device 475 that is configured to be used by a positioning system to determine a location of the given computing device system 400, 405. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the given computing device system 400, 405. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system(s) 400, 405 further includes a power source 415, such as a battery, for powering various circuits and other devices that are used to operate the given computing device system 400, 405. Embodiments of the computing device system(s) 400, 405 may also include a clock or other timer 450 configured to determine and, in some cases, communicate actual or relative time to the processor 410 or one or more other devices.

The computing device system(s) 400, 405 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the given computing device system 400, 405 and/or one or more of the process/method steps described herein. For example, the memory 420 may include such applications as a conventional web browser application 422, a user environment device application 421, entity application 424. These applications also typically instructions to a graphical user interface (GUI) on the display 430 that allows the user 110 to interact with the entity system 200, the user environment device 300, and/or other devices or systems. The memory 420 of the given computing device system 400, 405 may comprise a Short Message Service (SMS) application 423 configured to send, receive, and store data, information, communications, alerts, and the like via the wireless telephone network 152. In some embodiments, the user environment device application 421 provided by the user environment device 300 allows the user 110 to access the user environment device 300. In some embodiments, the entity application 424 provided by the entity system 200 and the user environment device application 421 allow the user 110 to access the functionalities provided by the user environment device 300 and the entity system 200.

The memory 420 can also store any of a number of pieces of information, and data, used by the given computing device system 400, 405 and the applications and devices that make up the given computing device system 400, 405 or are in communication with said computing device system 400, 405 to implement the functions of the computing device system 400, 405 and/or the other systems described herein.

Referring now to FIGS. 5 through 17, an example first party user environment (e.g., a customer service representative) and a second party user environment (e.g., a customer) are provided as would be generated in an example embodiment herein (e.g., facilitating a transaction). While the example illustrated in FIGS. 5 through 17 relate to a loan request approval process, the operations discussed herein can be used for any type of transaction or interaction between two or more parties. Additionally, while the operations are discussed in the context of a two-party transaction or interaction, additional parties may also be involved, either directly (e.g., three party deals) or indirectly (e.g., a company guaranteeing a given deal).

As detailed herein, each user environment may be associated with one or more given users and provided to said user(s) via a computing device system (e.g., the first computing device system 400 or the second computing device system 405). The user environments may be provided to the given user via a user interface (e.g., user interface 430). In an example embodiment, the first computing device system 400 may be associated with a first party (e.g., an entity associated with the entity system 200) and the second computing device system 405 may be associated with a second party (e.g., a customer or other third party dealing with an entity associated with the entity system 200). In various embodiments, each given party can have one or more user environments associated with one or more users (e.g., a company can have different user environments for different employees).

FIGS. 5 through 17 illustrate an example operation using the system disclosed herein and is merely an example of the operations (e.g., one or more operations discussed herein may be carried out in different ways). As discussed herein, the example operations of FIGS. 5 through 17 are an example transaction using the system discussed herein. For example, the operations of requesting, approving, and executing a loan for a third party by a financial entity is disclosed. As such, the transaction includes a first party (e.g., the financial entity or lender) and a second party (e.g., the lendee). As such, the first party has one or more user environments for one or more users (e.g., employees) working on the loan and the second party has one or more user environments for one or more users working on the loan. Additionally, FIGS. 5 through 17 are merely an example operation of the present disclosure and the operations discussed herein may be used for any interaction between a first party and a second party.

Referring now to FIG. 5, a first party user environment 500 and a second party user environment 510 are provided. The first party user environment 500 can be associated with a user of the first party (e.g., an employee of the financial entity, such as a relationship manager). The second party user environment 510 can be associated with a user of the second party (e.g., an employee of the lendee). As shown, the user of the second party may submit a loan request (e.g., by providing the required documents 511 and/or engaging the "Apply Now" interface 512). In response to a submitted loan request, an indication 501 to the first party user environment 500 associated with the user of the first party may be provided. The indication 501 may be a notification (e.g., a push notification to the first party user environment 500), a message, or the like. Such an indication 501 may be provided to the first party user environment 500 upon an input into the second party user environment 510).

Referring now to FIG. 6, the second party user environment 510 prompts the user associated of the second party associated with the second party user environment 510 to input lendee information 611. Some or all of the lendee information may be populated automatically via anti-money laundering (AML)/Know Your Customer (KYC) technology. In an instance in which one or more lendee information fields are prefilled, the user of the second party may be prompted to confirm the information. Additionally, the user associated with the second party can be prompted for additional lendee information necessary to complete the loan request. Various other machine learning techniques may be used to prefill lendee information.

During the process, the user of the second party may need help from the user of the first party (e.g., the lendee may not understand the lendee information requested by a given field). In such an instance, the user of the second party may submit a help request 612 (e.g., a message or the like indicating the issue being faced). As shown, the help request 612 may be provided to the first party user environment 500 (e.g., via a message 601 and/or notification 602).

In response to receiving the message, the user of the first party may toggle between the first party user environment 500 and the second party user environment 510. For example, the first party user environment 500 may include an engageable icon provided to the user of the first party that upon engagement, emulates the user interface of the second party user environment 510 onto the first party user environment 500. As shown in the first party user environment 500 of FIG. 6, the first party user environment 500 may have multiple engageable icons representing different parties (e.g., a first party may have multiple clients with each client having a user environment that can be accessed by the first party user environment 500).

Upon engagement of the engageable icon 603, the user of the first party can access the second party user environment 510 (e.g., the second party user environment is rendered within the first party user environment) and assist the user of the second party in completion of the lendee information input. The user of the first party may also be able to send messages to the second party user environment 510 (e.g., the user of the first party, upon viewing the second party user environment 510, may send a message to the user of the second party with instructions on how to complete the lendee information).

Referring now to FIG. 7, the second party user environment 510 can include instructions for the user of the second party to complete one or more additional tasks in order to finalize the loan request. For example, as shown, the second party user environment 510 can include one or more tasks 710 for the user of the second party to complete. An example task is an instance in which one or more documents relating to the loan request needs to be uploaded. As such, the second party user environment 510 sends a prompt to the user of the second party, indicating the one or more required documents (e.g., lendee financial information). The user of the second party can upload the document onto the second party user environment 510 (e.g., via an upload feature 720). Upon completing the tasks 710 (e.g., providing the required documents), the second party environment 510 may provide a prompt 730 to submit the requested information. The tasks 710 may be autogenerated by the system (e.g., the system may determine one or more tasks for the second party to complete based on previous information, such as discussed in reference to FIG. 19).

In some embodiments, additional users of the second party (e.g., a manager or the like) may have access to the second party user environment 510 and can view the uploaded documents. Additionally or alternatively, the additional user can have another user environment that includes similar information specifically relating to said user of the second party. For example, a manager can have a user environment that allows for said manager to approve the documents uploaded by the user of the second party via the second party user environment 510.

As discussed above, the user of the first party may be able to toggle between the first party user environment and the second party user environment during this process.

Referring now to FIG. 8, in response to the requested information being submitted, the second party user environment 510 may provide the user of the second party with confirmation 802 that the requested information was submitted. The confirmation 802 can also include additional instructions or expectations (e.g., expected wait times for receiving a response). Additionally, in response to the requested information being submitted, a notification 801 may be transmitted to the first party user environment 500 indicating that the requested information was submitted.

Referring now to FIG. 9, the first party user environment 500 can send information to the second party user environment 510. As shown, the user of the first party can send educational content to the user of the second party. For example, the second party user environment 510 depicted has a "Learning center" that includes information for the user of the second party to review (e.g., the user of the first party may select education content via the first party user environment 500 to send along to the second party as illustrated by content block 901). Additionally, in some instances, the education content may be required, and as such an additional task may be created in the second party user environment 510 to review and/or acknowledge said educational content. In various embodiments, the educational content may relate to the loan process, rate forecasting, and/or the like. While the content provided to the second party user environment in FIG. 9 is educational content, other types of content may be provided in a similar fashion.

Referring now to FIG. 10, a user interface of the first party user environment 500 is provided illustrating an instance in which a user of the first party is requesting additional information from a user of the second party. The user of the first party may be the same user of the first party discussed above or another user of the first party (e.g., another user of the first party may review the information for accuracy). As such, in an instance in which the user of the first party is a different user, the user may have a different user environment from the first party user environment 500. For example, each user of the first party may have a different user environment with similar functionality, but specialized for the specific user (e.g., a manager may not need to see the same information that a non-manager needs to regularly access). As such, the first party user environment may be multiple user environments for different users of the first party. Alternatively, the first party user environment may be a single user environment (e.g., in an instance in which the first party only has a single user or all of the users of the first party access the same user environment).

As shown in FIG. 10, the given user of the first party may select a document or other information that is incorrect or incomplete for update by the second party. In some embodiments, the first party user environment 500 may be configured to flag documents as incorrect or incomplete (e.g., via the entity system 200 or the like, a submitted document may be analyzed, such as using machine learning). Once the user of the first party selects a given document or information for correction (e.g., as indicated by the bolded box 1010), the first party user environment 500 may provide a prompt 1020 to the user of the first party to indicate one or more users of the second party to fix any issues. The user of the first party may also be prompted to input one or more tasks 1030 relating to said document for the indicated user of the second party.

The user of the second party indicated by the user of the first party may be the same user of the second party discussed above or another user of the second party (e.g., another user of the second party may have more information that the original user). As such, in an instance in which the user of the second party is a different user, the user may have a different user environment from the second party user environment 510. For example, each user of the second party may have a different user environment with similar functionality, but specialized for the specific user (e.g., a manager may not need to see the same information that a non-manager needs to regularly access). As such, the second party user environment may be multiple user environments for different users of the second party. Alternatively, the second party user environment may be a single user environment (e.g., in an instance in which the second party only has a single user or all of the users of the second party access the same user environment).

Referring now to FIG. 11, a first party user environment 500 is provided interacting with multiple users of the first party. As shown, the first party user environment 500 may include a communication function 1110 that allows the users of the first party to interact with one another. For example, a manager can follow up with another employee on the status of a given request. In some instances, such a communication function 1110 may be provided for communication between the second party users or communication users of the first party and the users of the second party.

Referring now to FIG. 12, the second party user environment 510 may able to assign a given task to another user of the second party. For example, a user of the second party may be assigned to upload a given document but may not have access to the given document to upload. As such, the user of the second party that was assigned a task may reassign said task to another user of the second party, at which time the newly assigned user of the second party may complete the task via the second party user environment 510 as discussed herein for a user of the second party.

In response to the task being completed by a user of the second party, one or more users of the first party may receive a notification 1205 that said task was completed. Additionally or alternatively, the user of the first party may receive a new task 1210 in response to the second party task being completed.

Referring now to FIG. 13, an example first party user environment 500 is depicted for a user of the first party to review the status 1310 of the loan request. As such, upon the completion of required tasks by the second party (e.g., via the second party user environment 510), either automatically or upon approval by a user of the first party, the loan request may be advanced in processing (e.g., multiple departments or users of the first party may need to process the loan request before an approval decision is made).

Referring now to FIG. 14, the first party user environment and/or the second party user environment 510 may be able to access information relating to the loan request. As shown, a status window 1400 may be provided that allows for a user with certain authorizations to access parts of the loan request and related status. The document center 1410 may show one or more documents submitted during the loan request process along with whether a given document has been accepted. The message center 1420 may include one or more messages to the given user relating to the loan request process (e.g., the message center may include messages indicating one or more tasks have been completed or are still outstanding). The Learning Center 1430 may include educational content relating to the loan request process. The task center 1440 may include outstanding and/or completed tasks for a given user and/or other users (e.g., a manager may be able to access the tasks for non-managers).

Referring now to FIG. 15, confirmation screens are provided as provided to a first party user environment 500 and a second party user environment in accordance with an example embodiment. Upon completion of the review process by the first party, an approval determination may be provided to the second party user environment 510. For example, as shown, the loan request was approved and one or more users of the second party user environment 510 are notified that the loan request was approved. Additional information may also be included in the approval determination provided, such as reference number, expected timeframe for receiving funds, and/or the like. The first party user environment 500 may get a similar confirmation that the loan request approval has been completed (e.g., confirming all steps of the review process have been completed). Additionally, first party user environment 500 may also be capable of accessing the confirmation of the second party user environment 510 (e.g., the first party user environment 500 may allow for review of the second party user environment 510 throughout the process).

Referring now to FIG. 16, an example user interface of the second party user environment 510 is provided after the given loan request is approved. As shown, the second party user environment 510 may include a next steps tab 1610 configured to provide the second party users with additional information relating to the loan request (e.g., how onboarding works and/or how to set up payments for the loan).

Referring now to FIG. 17, additional interaction between a first party user environment 500 and a second party user environment 510 is provided. As shown, a user of the first party can toggle between the first party user environment 500 and the second party user environment 510. The user of the first party can confirm that the second party user environment 510 is displaying the correct information. Such a viewing of the second party user environment 510 by the user of the first party may be in response to a question or request from a user of the second party. Additionally or alternatively, the viewing of the second party user environment 510 by the user of the first party may be independent of a request by a user of the second party (e.g., a user of the first party may toggle to a view of the second party user environment 510 during a review of the loan request).

In various embodiments, the second party user environment 510 may be used outside of request process. For example, the second party user environment 510 can be used make loan payments, check account balances, and the like. Additionally, the second party user environment 510 may facilitate additional interactions between the first party and the second party (e.g., the second party may use the second party user environment 510 for banking, additional loan requests, and/or the like).

Referring now to FIG. 18, a method of providing access to personalized user environments is provided. The method may be carried out by a system discussed herein (e.g., the entity system 200, the user environment device 300, the first computing device system 400, and/or the second computing device system 405). An example system may include at least one non-transitory storage device and at least one processing device coupled to the at least one non-transitory storage device. In such an embodiment, the at least one processing device is configured to carry out the method discussed herein.

Referring now to Block 1800 of FIG. 18, the method includes generating a first party user environment associated with one or more users of a first party. The first party user environment 500 may be rendered to a user interface associated with one or more users of the first party. As discussed above, the first party user environment 500 may be associated with or controlled by an entity associated with the entity system 200. The first party user environment 500 may include one or more user environments relating to one or more users of the first party (e.g., a given employee may have a slightly different user environment than another).

Referring now to Block 1810 of FIG. 18, the method includes generating a second party user environment associated with one or more users of a second party. The second party user environment 510 may be rendered to a user interface associated with one or more users of the second party. As discussed above, the second party user environment 510 may be associated with or controlled by a party interacting with an entity associated with the entity system 200. The second party user environment 510 may include one or more user environments relating to one or more users of the second party (e.g., a given employee may have a slightly different user environment than another).

Referring now to Block 1820 of FIG. 18, the method includes causing rendering of the first party user environment to the one or more users of the first party associated with the first party user environment. The first party user environment 500 may be in the form of a portal (e.g., a user of the first party may log into said portal). Via the first party user environment 500, a user of the first party can create, alter, or delete tasks for a user of the second party to complete via the second party user environment 510. Additionally, the first party user environment 500 and the second party user environment 510 may interact with one another in various ways as discussed herein (e.g., messages).

Referring now to Block 1830 of FIG. 18, the method includes causing rendering of the second party user environment to the one or more users of the second party associated with the second party user environment. The second party user environment 510 may be in the form of a portal (e.g., a user of the second party may log into said portal). The second party user environment 510 may request and/or receive information from the user of the second party relating to the second party. The information requested may be based on the type of interactions being facilitated. For example, as shown in the discussion above, in an instance in which the interaction between the first party and the second party is in the form of a loan request, the information requested may include a request for lendee information or documents relating to the lendee.

Referring now to Block 1840 of FIG. 18, the method includes receiving a second party viewing request from the first party user environment. During operation, a user of the first party using the first party user environment 500 may engage an engageable icon (e.g., icon 603 shown in FIG. 6), that provides a transmission of a second party viewing request. As such, the user of the first party engages the icon 603 in order to toggle into "client view." The second party viewing request may be in response to a help request from the second party user environment 510. For example, the user of the second party may submit a help request via the second party user environment in an instance in which said user does not understand a request or task. Additionally or alternatively, the user of the first party may send a second party viewing request without a help request (e.g., the user of the first party may be checking to make sure there are no issues with the second party user environment 510).

Referring now to Block 1850 of FIG. 18, the method includes causing rendering of the second party user environment within the first party user environment in response to receiving the second party viewing request. The rendering of the second party user environment within the first party user environment may be referred to as "client view." As such, the user of the first party may be able to see the second party user environment as rendered to the user(s) of the second party. In various embodiments, the user of the first party may be able to manipulate or alter the second party user environment 510 via the first party user environment 500 (e.g., the user of the first party may complete an action required by the user of the second party).

In various embodiments, additional parties may have user environments generated. For example, a third party user environment may be generated for a third party, independent of the second party, that is also interacting with the first party. For example, in an instance in which the first party is a financial entity, one or more clients or prospective clients may have a user environment generated. As such, any additional user environments (e.g., the third party user environment) may be rendered within the first party user environment. For example, a user of the first party may toggle between the first party user environment, the second party user environment, and the third party user environment. Additionally, in some instances other related parties may have user environments (e.g., in an instance in which a related party may be able to provide information relating to the interaction).

Referring now to FIG. 19, a flowchart illustrating data flow between different party user environments used in various embodiments of the present disclosure is provided. The data flow between user environments can be used as discussed herein, such as the operations discussed in reference to FIG. 18 (e.g., facilitating a loan request). The data flow can be carried out by a system discussed herein (e.g., the entity system 200, the user environment device 300, the first computing device system 400, and/or the second computing device system 405). An example system may include at least one non-transitory storage device and at least one processing device coupled to the at least one non-transitory storage device. In such an embodiment, the at least one processing device is configured to carry out the method discussed herein.

While various embodiments of the disclosure discuss using the methods discussed herein for facilitating loan requests, various other interactions between parties may be facilitated using the operations discussed herein. For example, the first party may be a merchant and the second party may be a customer, such that the operations may be used to facilitate a transaction between the merchant and customer. For example, a customer may browse a website of the merchant and the merchant may receive data relating to the items that the customer viewed in order to provide a recommendation to the customer. Additionally, the merchant may also have access to the user information about the customer (e.g., the customer may have an account with the merchant and has allowed the merchant to store information relating to the user, such as mailing address, payment information or the like). As such, a transaction between the customer and the merchant can be expedited using the operations discussed herein.

Another example embodiment provides a system in which a second party (e.g., a user) may be opening an account with a first party (e.g., a merchant or financial institution). The first party may receive data that indicates the second party is browsing account options (or has requested an account to be opened) and the first party can begin the on-boarding process for the user (e.g., the first party may have access to personal information on the second party, such as an instance in which the second party already has an existing account with the first party, and the first party can begin the account opening process (e.g., auto-populating paperwork, determining account parameters, etc.).

Referring now to Block 1900 of FIG. 19, the method includes providing for a flow of data between the first party user environment and the second party user environment. As discussed above in reference to FIGS. 5-17, different users may have different user environments, for example a merchant or financial institution may be a first party with a first party user environment that includes information relating to the merchant and a customer may be a second party with a second party user environment in which the customer can interact with the first party (e.g., a customer may request a loan, initiate a transaction, open an account, etc.).

The system discussed herein allows for a transfer of data between the different user environments, to allow for improved experiences. For example, the first party may receive metadata or other data that indicates the browsing history of the second party (e.g., indicates that the second party has viewed a given product or service). As such, the first party can receive this information without the second party having to submit a formal request and allows the first party to tailor the first party user environment based on the interests of the second party. For example, as discussed in reference to Block 1910 of FIG. 19 below, the first party may be able to provide recommendations to the second party based on the data received from the second party user environments.

Referring now to Block 1910 of FIG. 19, the method includes allowing a first party to take an action based on data received from the second party user environment. As such, the actions of the second party on the second party user environment can be used by the first party to personalize and/or speed up an intended or potential interaction. For example, the second party (e.g., a customer) may be browsing loan options offered by the first party (e.g., a bank). The information relating to the browsing of the second party may be transmitted to the first party (e.g., the first party may receive data relating to the type of products researched, location of product, and/or the like). Based on the data received, the first party can then expedite background processes and provide the second party with recommendations. For example, the second party may be researching home loans in a specific state and the first party may receive data indicating that the second party is researching said loans in the specific state. As such, the first party can then provide recommendations to the second party, such as pre-approval information (e.g., loan rates and terms).

Referring now to Block 1920 of FIG. 19, the method includes providing data driven insights to the second party user environment based on the data received from the second party user environment. The system may be configured to use machine learning to provide recommendations to users based on the data transferred between user environments. For example, the second party (e.g., a customer) may research or request information relating to a specific product or service (e.g., a loan, product, and/or otherwise) and the system may then provide recommendations automatically based on the second party user environment history. In an example embodiment in which a customer is looking for a loan, the system may analyze the data received from the second party user environment that relates to the loan (e.g., loan type, amount, and/or the like) and provide a recommendation to the second party (e.g., the system may provide one or more offers to the second party user environment based on the research or request of the second party).

Additionally, the system may provide data driven insights to the first party user environment. For example, the system may provide the first party with potential products or services to recommend to the second party. The data driven insights can then be approved by the first party before being presented to the second party. Example data driven insights include products, services, terms for products and/or services, and/or the like.

As will be appreciated by one of skill in the art, the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, resident software, micro-code, and the like), or an embodiment combining software and hardware aspects that may generally be referred to herein as a "system." Furthermore, embodiments of the present disclosure may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present disclosure may be written in an object oriented, scripted or unscripted programming language such as Java, Perl, Smalltalk, C++, or the like. However, the computer program code for carrying out operations of embodiments of the present disclosure may also be written in conventional procedural programming languages, such as the "C" programming language or similar programming languages.

Embodiments of the present disclosure are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the disclosure.

As the phrase is used herein, a processor may be "configured to" perform a certain function in a variety of ways, including, for example, by having one or more general-purpose 1 circuits perform the function by executing particular computer-executable program code embodied in computer-readable medium, and/or by having one or more application-specific circuits perform the function.

Embodiments of the present disclosure are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the disclosure. Therefore, it is to be understood that, within the scope of the appended claims, the disclosure may be practiced other than as specifically described herein.

What is claimed is:

1. A system for providing access to personalized user environments, the system comprising:
at least one non-transitory storage device; and at least one processing device coupled to the at least one non-transitory storage device, wherein the at least one processing device is configured to:

generate a first party user environment associated with one or more users of a first party;

generate a second party user environment associated with one or more users of a second party;

cause rendering of the first party user environment to the one or more users of the first party associated with the first party user environment;

cause rendering of the second party user environment to the one or more users of the second party associated with the second party user environment;

receive a help request from the second party user environment for the first party user environment to interact with the second party user environment;

generate a second party viewing request from the first party user environment in response to the help request, wherein the second party viewing request is a request to render the second party user environment within the first party user environment;

in response to receiving the second party viewing request, cause rendering of the second party user environment within the first party user environment, wherein the second party user environment is alterable via the first party user environment;

provide an engageable icon to the first party within the first party user environment, wherein engagement of the engageable icon causes toggling between the first party user environment and an emulation of the second party user environment overlaid on the first party user environment;

receive data indicating the first party has engaged the engageable icon;

toggle between rendering of the second party user environment and the first party user environment within the first party user environment;

following the rendering of the second party user environment and the first party user environment within the first party user environment, utilize a machine learning model to provide a recommendation based on data transferred between the first party user environment and the second party user environment; and utilize the machine learning model to automatically prefill information fields relating to the second party within the second party user environment.

2. The system of claim 1, wherein the at least one processing device is configured to generate a task for the second party user environment in response to an input into the first party user environment.

3. The system of claim 1, wherein the second party user environment is configured to receive one or more documents relating to the second party.

4. The system of claim 1, wherein the at least one processing device is configured to provide a help notification to the first party user environment in response to a help request from the second party user environment.

5. The system of claim 1, wherein the at least one processing device is configured to generate a third party user environment associated with one or more users of a third party, wherein the third party is independent of the second party.

6. The system of claim 5, wherein the at least one processing device is configured to:

cause rendering of the third party user environment user environment to the one or more users of the third party associated with the third party user environment;

receive a third party viewing request from the first party user environment; and in response to receiving the third party viewing request, cause rendering of the third party user environment within the first party user environment.

7. The system of claim 6, wherein the first party user environment can switch between the second party user environment and the third party user environment.

8. A computer program product for providing access to personalized user environments, the computer program product comprising at least one non-transitory computer-readable medium having computer-readable program code portions embodied therein, the computer-readable program code portions comprising:

an executable portion configured to generate a first party user environment associated with one or more users of a first party;

an executable portion configured to generate a second party user environment associated with one or more users of a second party;

an executable portion configured to cause rendering of the first party user environment to the one or more users of the first party associated with the first party user environment;

an executable portion configured to cause rendering of the second party user environment to the one or more users of the second party associated with the second party user environment;

an executable portion configured to receive a help request from the second party user environment for the first party user environment to interact with the second party user environment;

an executable portion configured to generate a second party viewing request from the first party user environment in response to the help request, wherein the second party viewing request is a request to render the second party user environment within the first party user environment;

an executable portion configured to cause rendering of the second party user environment within the first party user environment in response to receiving the second party viewing request, wherein the second party user environment is alterable via the first party user environment;

an executable portion configured to provide an engageable icon to the first party within the first party user environment, wherein engagement of the engageable icon causes toggling between the first party user environment and an emulation of the second party user environment overlaid on the first party user environment;

an executable portion configured to receive data indicating the first party has engaged the engageable icon;

an executable portion configured to toggle between rendering of the second party user environment and the first party user environment within the first party user environment;

an executable portion configured to following the rendering of the second party user environment and the first party user environment within the first party user environment, utilize a machine learning model to provide a recommendation based on data transferred between the first party user environment and the second party user environment; and an executable portion configured to utilize the machine learning model to automatically prefill information fields relating to the second party within the second party user environment.

9. The computer program product of claim 8, further comprising an executable portion configured to generate a task for the second party user environment in response to an input into the first party user environment.

10. The computer program product of claim 8, wherein the second party user environment is configured to receive one or more documents relating to the second party.

11. The computer program product of claim 8, further comprising an executable portion configured to provide a help notification to the first party user environment in response to a help request from the second party user environment.

12. The computer program product of claim 8, further comprising an executable portion configured to generate a third party user environment associated with one or more users of a third party, wherein the third party is independent of the second party.

13. The computer program product of claim 12, further comprising:
    an executable portion configured to cause rendering of the third party user environment user environment to the one or more users of the third party associated with the third party user environment;
    an executable portion configured to receive a third party viewing request from the first party user environment; and
    an executable portion configured to cause rendering of the third party user environment within the first party user environment in response to receiving the third party viewing request.

14. The computer program product of claim 13, wherein the first party user environment can switch between the second party user environment and the third party user environment.

15. A computer-implemented method for providing access to personalized user environments, the method comprising:
    generating a first party user environment associated with one or more users of a first party;
    generating a second party user environment associated with one or more users of a second party;
    causing rendering of the first party user environment to the one or more users of the first party associated with the first party user environment;
    causing rendering of the second party user environment to the one or more users of the second party associated with the second party user environment;
    receiving a help request from the second party user environment for the first party user environment to interact with the second party user environment;
    generating a second party viewing request from the first party user environment in response to the help request, wherein the second party viewing request is a request to render the second party user environment within the first party user environment;
    in response to receiving the second party viewing request, causing rendering of the second party user environment within the first party user environment, wherein the second party user environment is alterable via the first party user environment;
    providing an engageable icon to the first party within the first party user environment, wherein engagement of the engageable icon causes toggling between the first party user environment and an emulation of the second party user environment overlaid on the first party user environment;
    receiving data indicating the first party has engaged the engageable icon;
    toggling between rendering of the second party user environment and the first party user environment within the first party user environment;
    following the rendering of the second party user environment and the first party user environment within the first party user environment, utilizing a machine learning model to provide a recommendation based on data transferred between the first party user environment and the second party user environment; and
    utilizing the machine learning model to automatically prefill information fields relating to the second party within the second party user environment.

16. The computer-implemented method of claim 15, further comprising generating a task for the second party user environment in response to an input into the first party user environment.

17. The computer-implemented method of claim 15, wherein the second party user environment is configured to receive one or more documents relating to the second party.

18. The computer-implemented method of claim 15, further comprising providing a help notification to the first party user environment in response to a help request from the second party user environment.

19. The computer-implemented method of claim 15, further comprising generating a third party user environment associated with one or more users of a third party, wherein the third party is independent of the second party.

20. The computer-implemented method of claim 19, further comprising:
    causing rendering of the third party user environment user environment to the one or more users of the third party associated with the third party user environment;
    receiving a third party viewing request from the first party user environment; and
    in response to receiving the third party viewing request, causing rendering of the third party user environment within the first party user environment.

* * * * *

UNITED STATES PATENT AND TRADEMARK OFFICE
CERTIFICATE OF CORRECTION

Page 1 of 1

PATENT NO. : 12,039,219 B2
APPLICATION NO. : 17/725952
DATED : July 16, 2024
INVENTOR(S) : Daniel Thomas Roberson, Gaurav Ramesh Khanna and Trevor Aitchison Runberg It is certified that error appears in the above-identified patent and that said Letters Patent is hereby corrected as shown below:

On the Title Page

In Item (72) (Name of Inventors), the second named inventor "Guarav Ramesh Khanna" is changed to "Gaurav Ramesh Khanna"

Signed and Sealed this
Eleventh Day of February, 2025

Coke Morgan Stewart
*Acting Director of the United States Patent and Trademark Office*